United States Patent [19]
Watanabe et al.

[11] Patent Number: 5,809,278
[45] Date of Patent: Sep. 15, 1998

[54] CIRCUIT FOR CONTROLLING ACCESS TO A COMMON MEMORY BASED ON PRIORITY

[75] Inventors: Koichi Watanabe, Kawasaki; Hironobu Machida, Tokyo; Kazuo Sasama, Kawasaki, all of Japan

[73] Assignee: Kabushiki Kaisha Toshiba, Kanagawa-ken, Japan

[21] Appl. No.: 363,528

[22] Filed: Dec. 23, 1994

[30] Foreign Application Priority Data

Dec. 28, 1993 [JP] Japan ................................ 5-349144

[51] Int. Cl.$^6$ ....................................... G06F 13/18
[52] U.S. Cl. ..................... 395/477; 395/478; 395/485; 395/732; 395/512
[58] Field of Search .................... 395/478, 485, 395/477, 164, 732, 512

[56] References Cited

U.S. PATENT DOCUMENTS

| | | | |
|---|---|---|---|
| 4,829,467 | 5/1989 | Ogata | 395/732 |
| 5,016,167 | 5/1991 | Nguyen et al. | 395/478 |
| 5,115,507 | 5/1992 | Callemyn | 395/478 |
| 5,301,333 | 4/1994 | Lee | 395/732 |
| 5,392,434 | 2/1995 | Bryant et al. | 395/732 |
| 5,509,136 | 4/1996 | Korekata et al. | 395/478 |

*Primary Examiner*—Tod R. Swann
*Assistant Examiner*—Reginald G. Bragdon
*Attorney, Agent, or Firm*—Limbach & Limbach LLP

[57] ABSTRACT

An access control apparatus comprises a memory accessed by a plurality of devices, a circuit for giving priority levels to the requests of these devices in access to the memory, a circuit for selecting one from these access requests according to the priority levels, and a control circuit for allowing a device not selected to access the memory in preference to the other ones, after a specified time has elapsed since the access was started. Use of the control circuit assures efficient access for a low-priority access request.

4 Claims, 28 Drawing Sheets

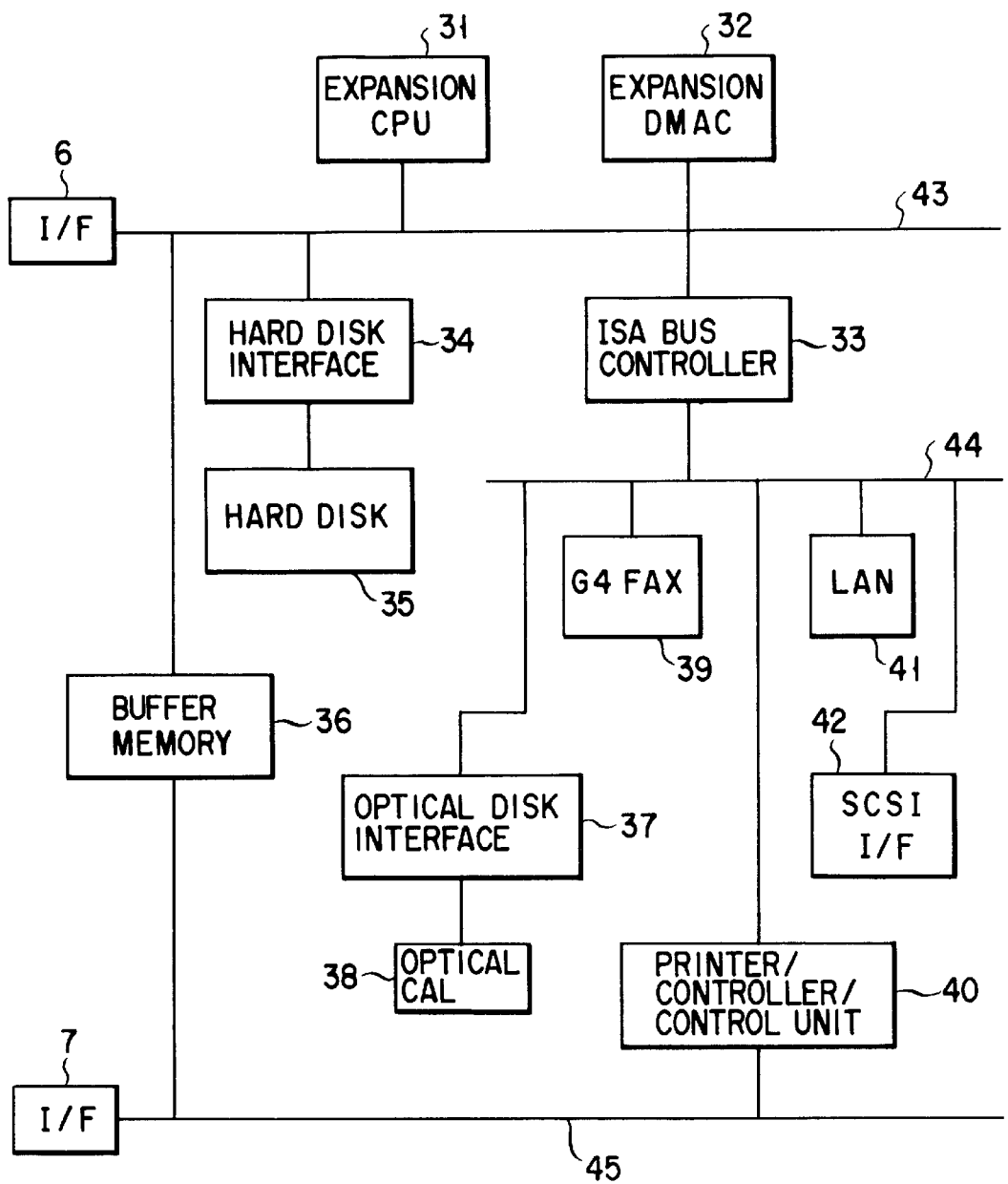
F I G. 4

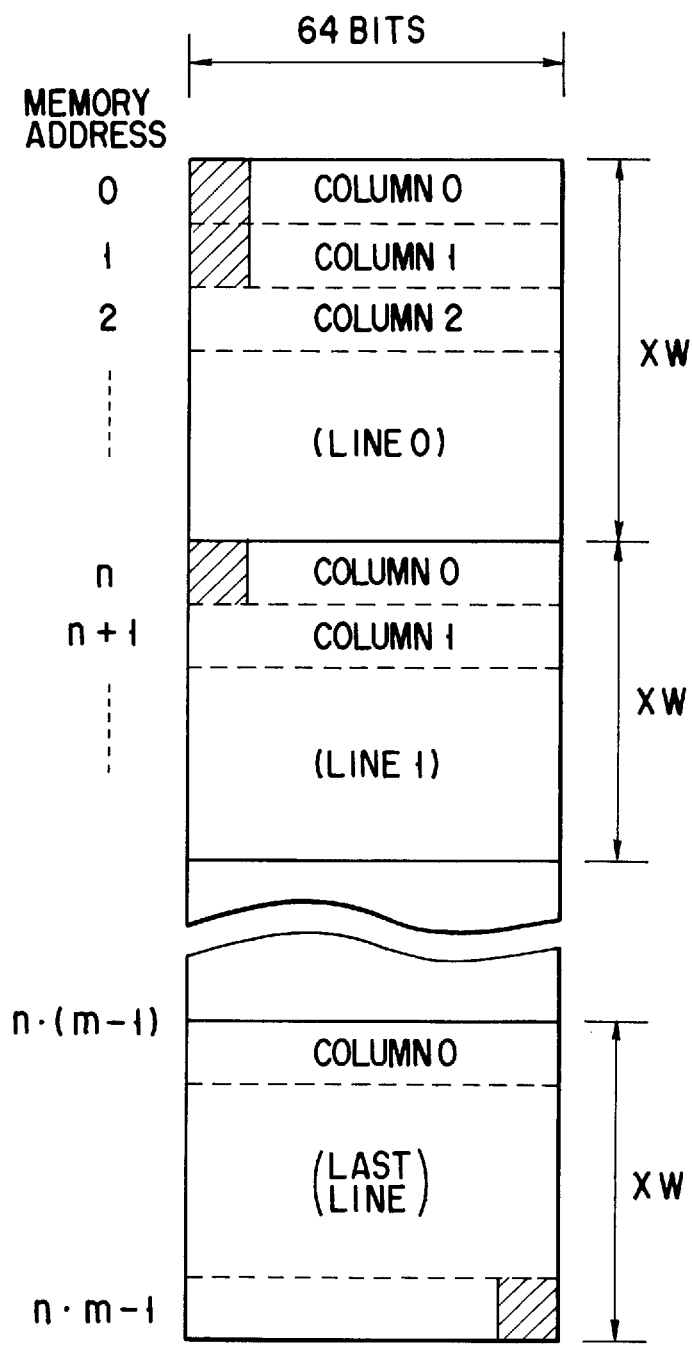
F I G. 10

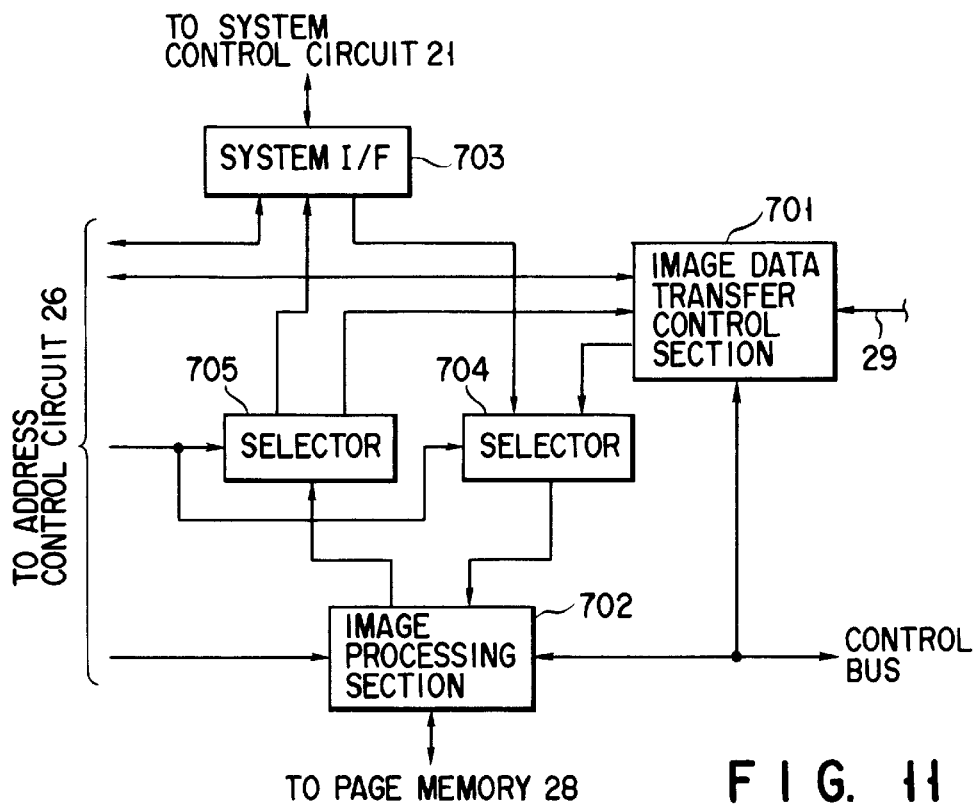
F I G. 11
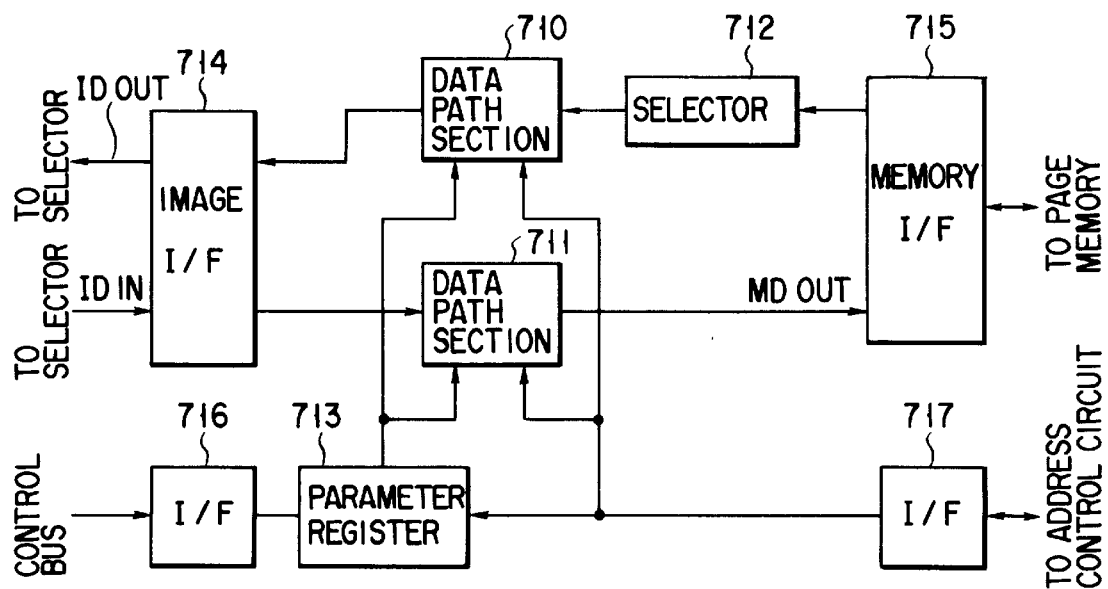
F I G. 12

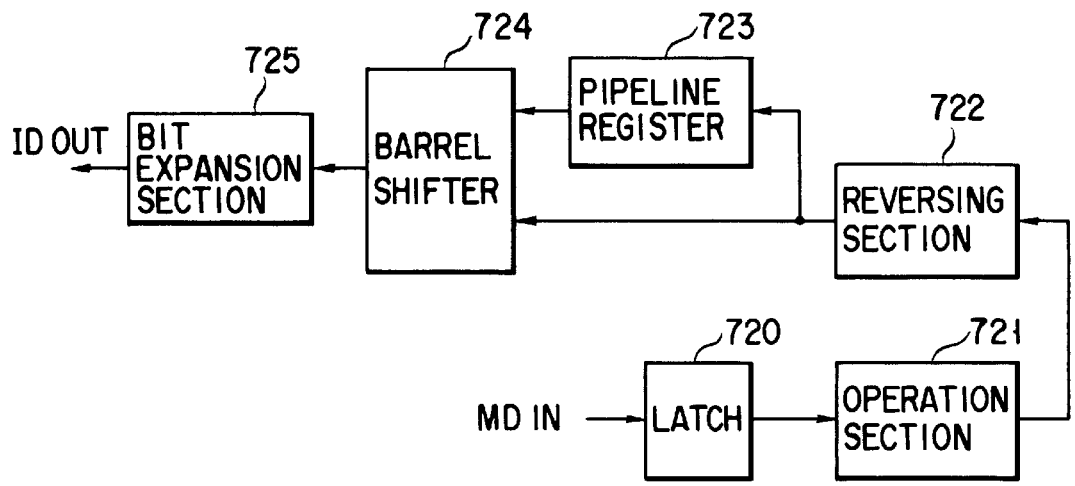
F I G. 13
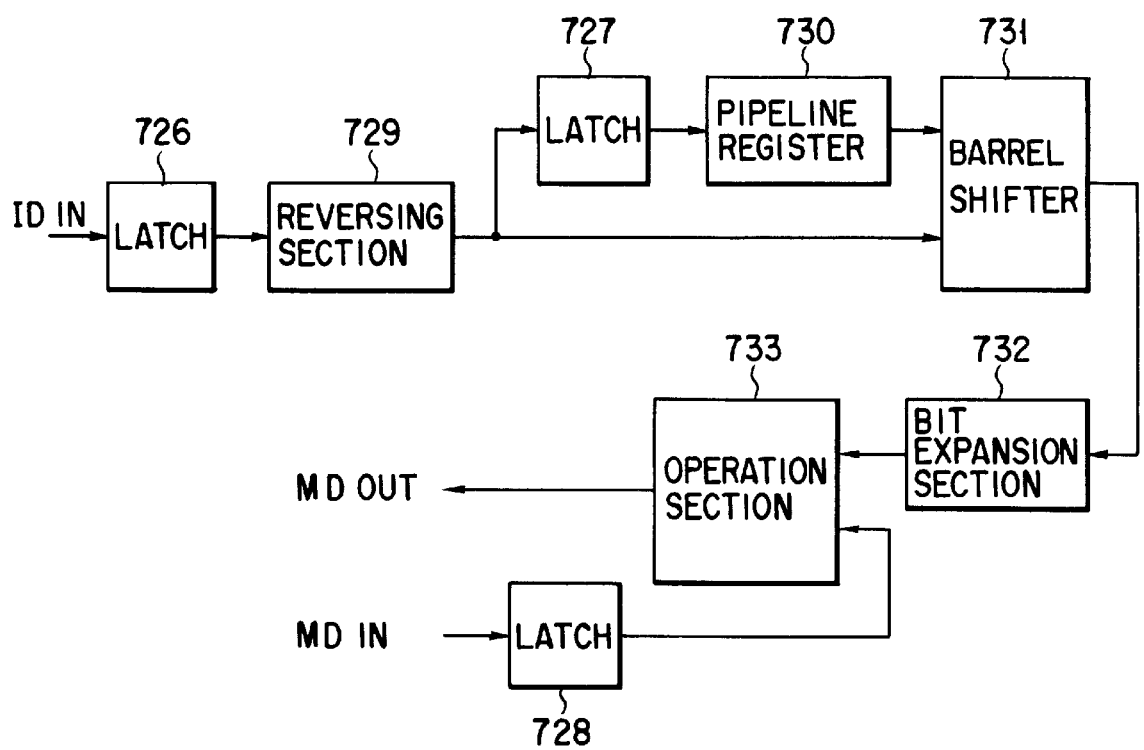
F I G. 14

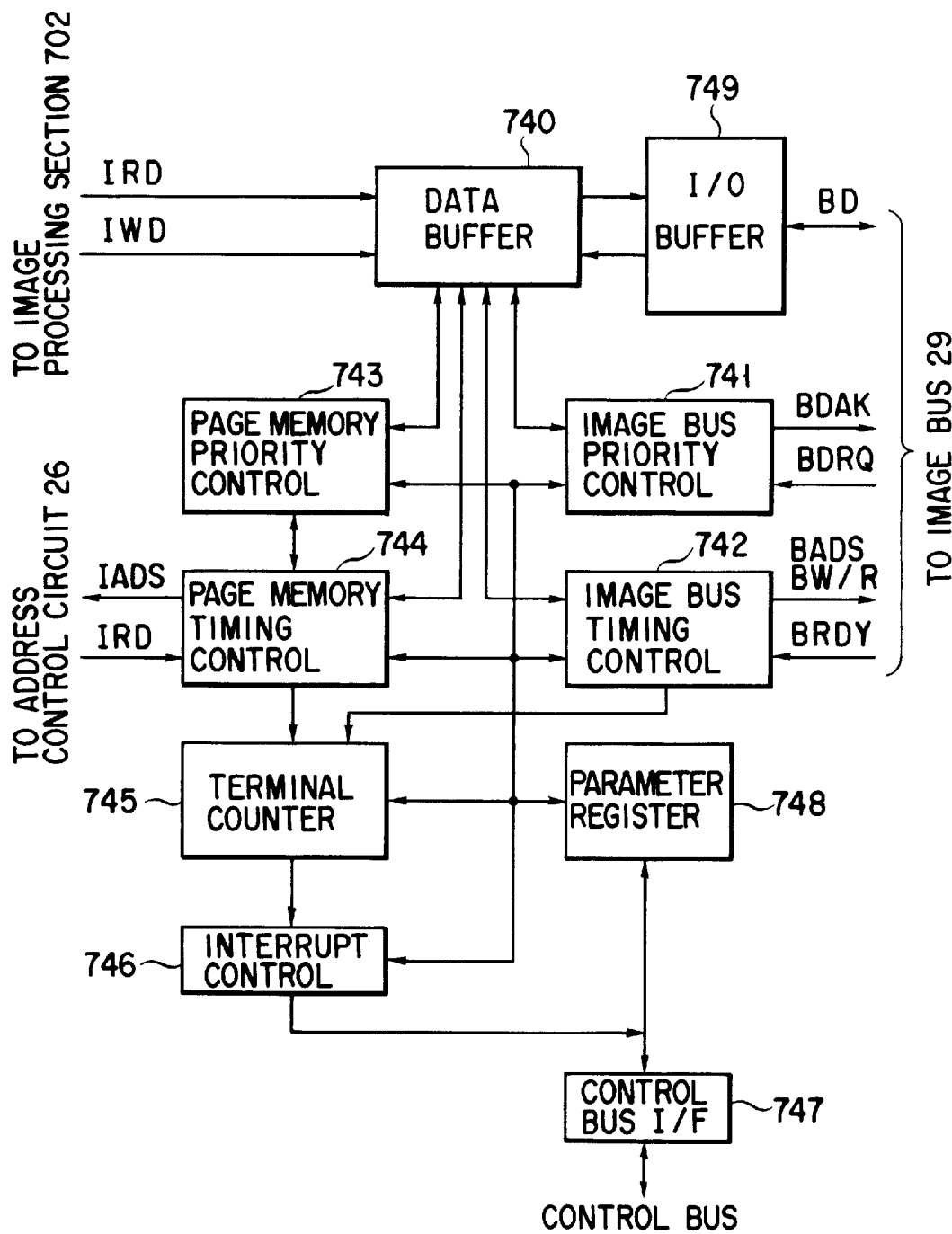
F I G. 15

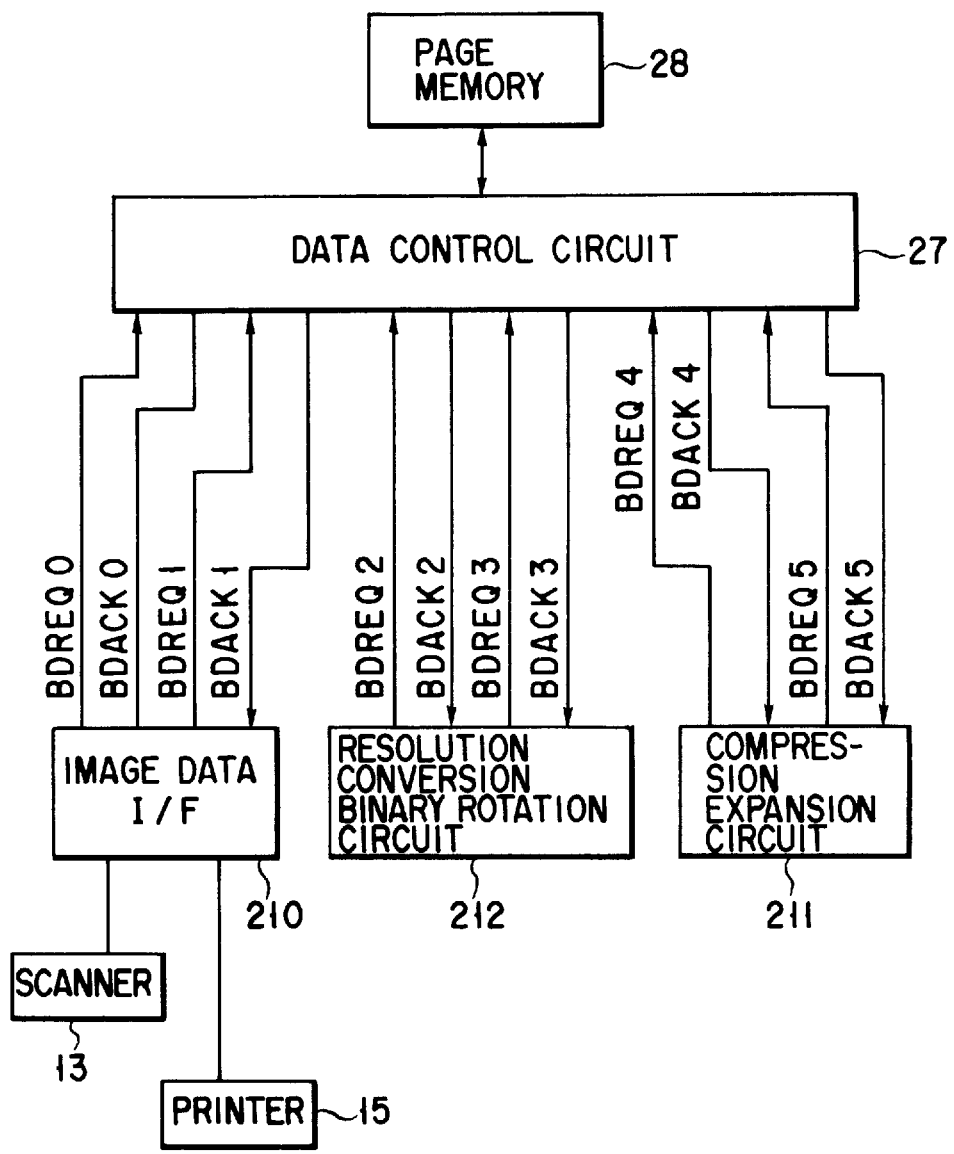
F I G. 21

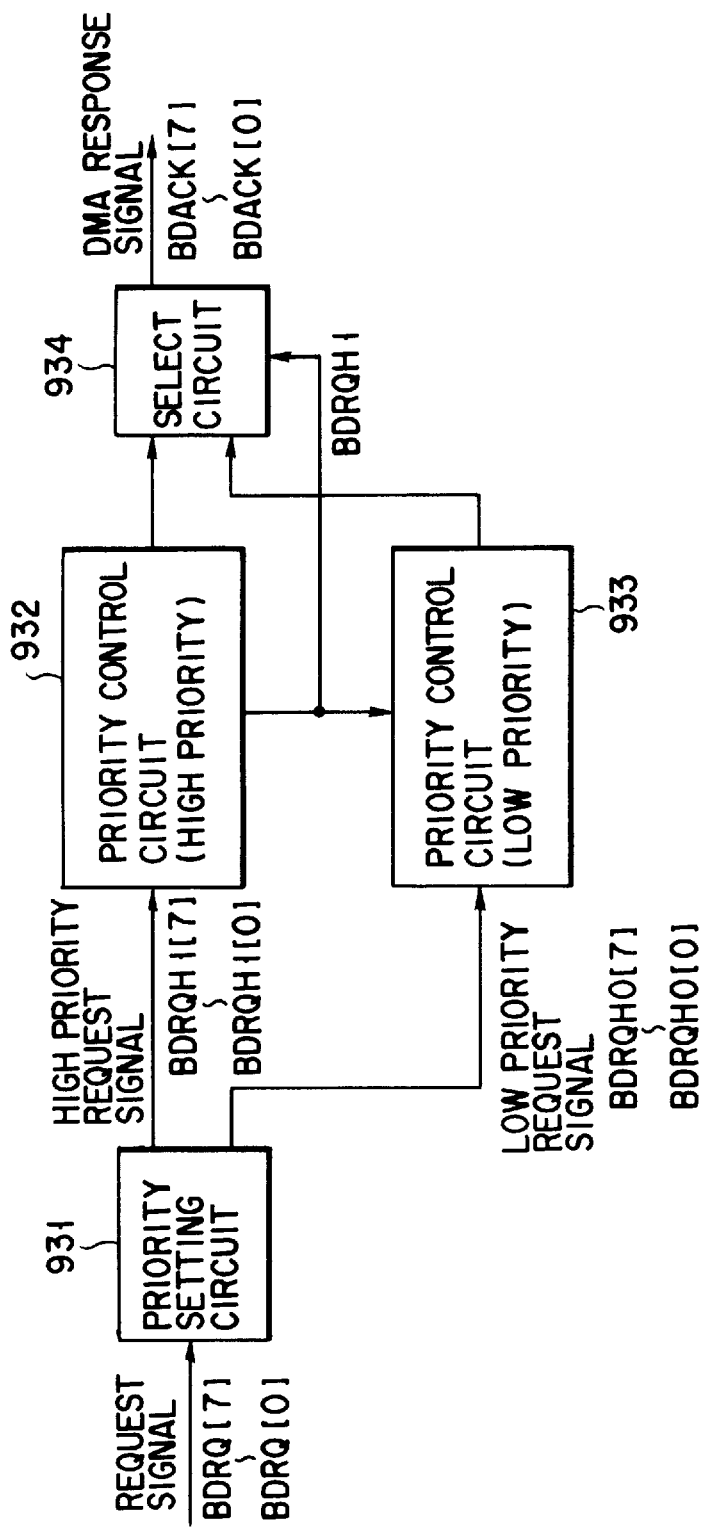
F I G. 23

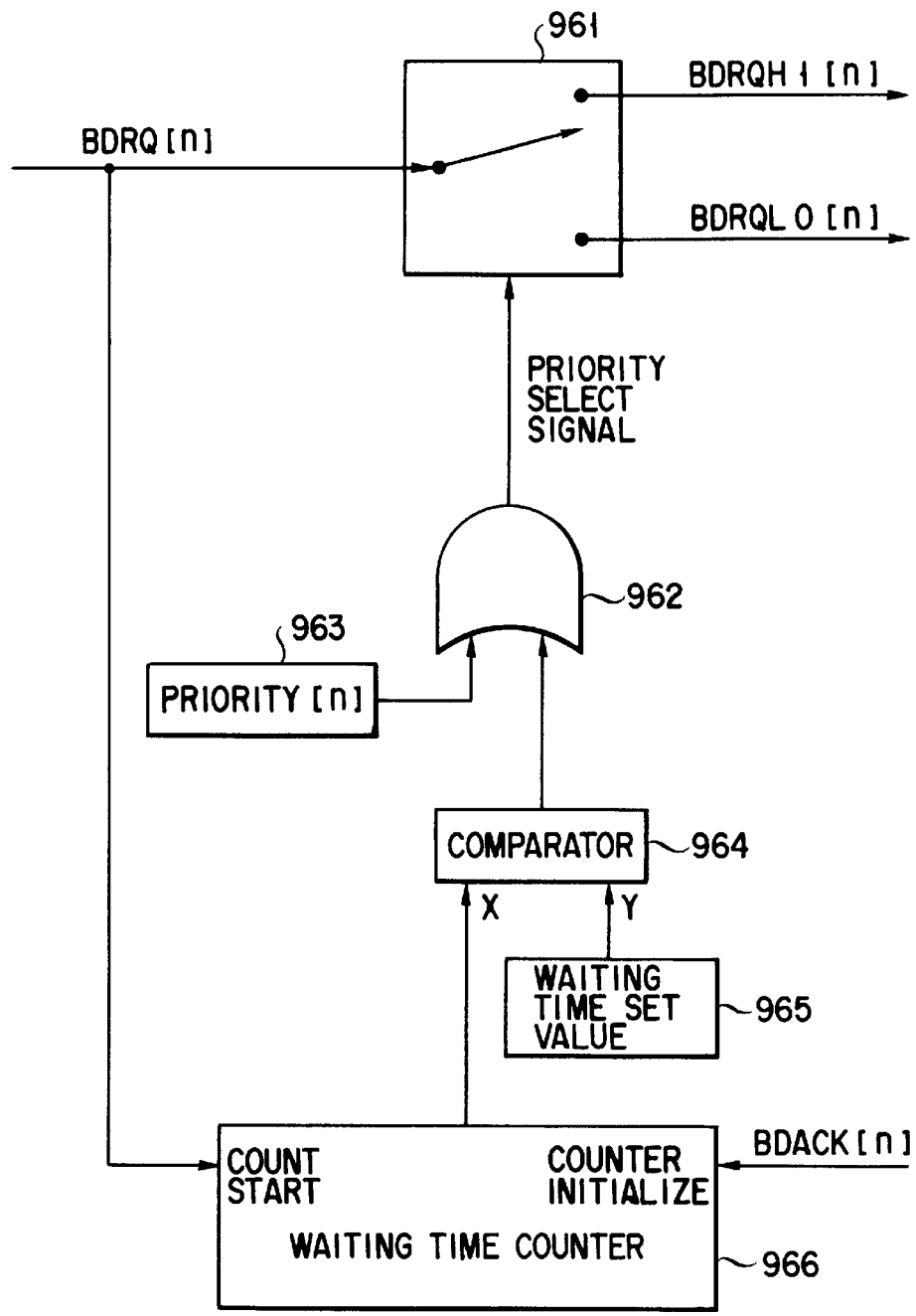
F I G. 25A

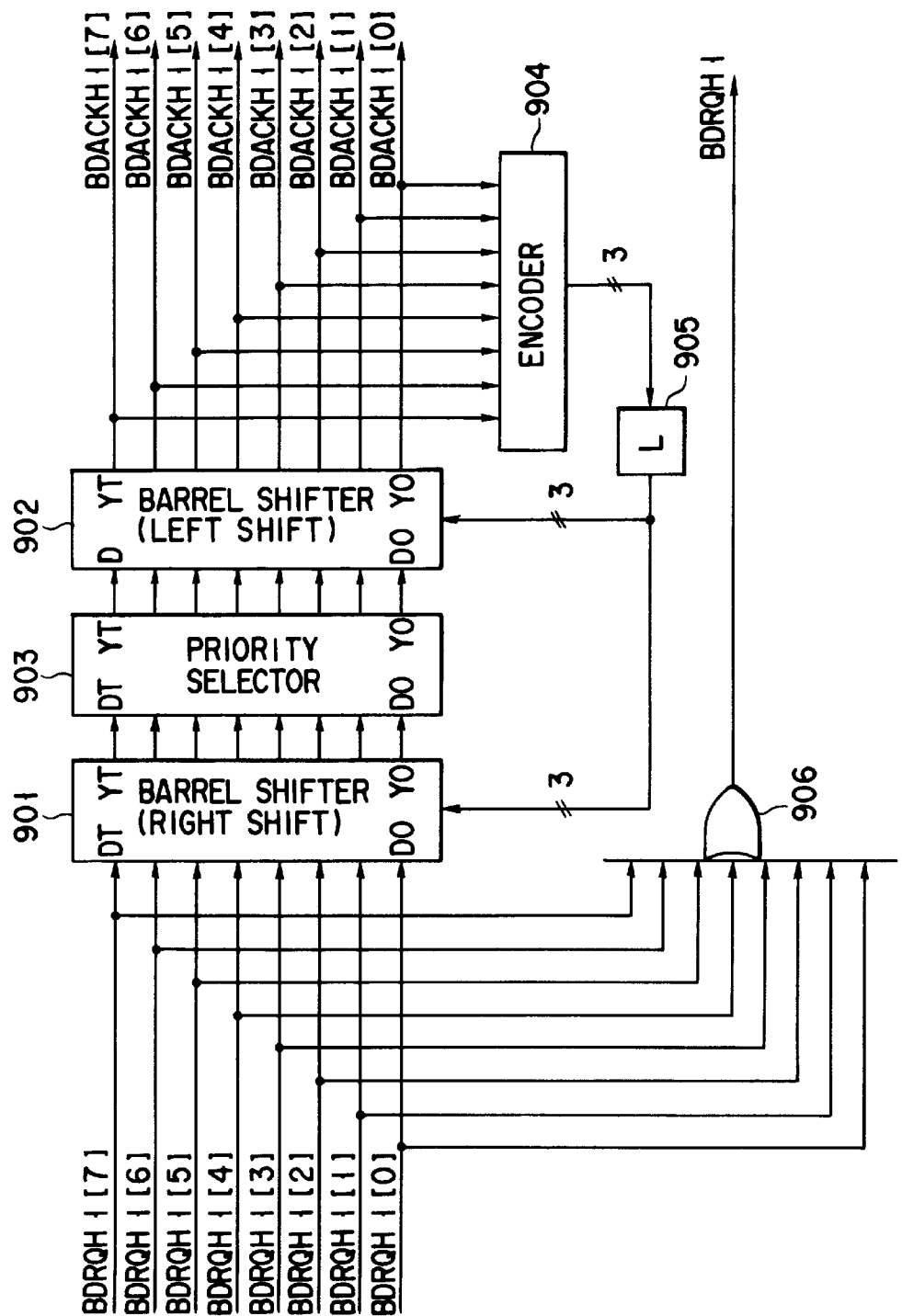
F I G. 26

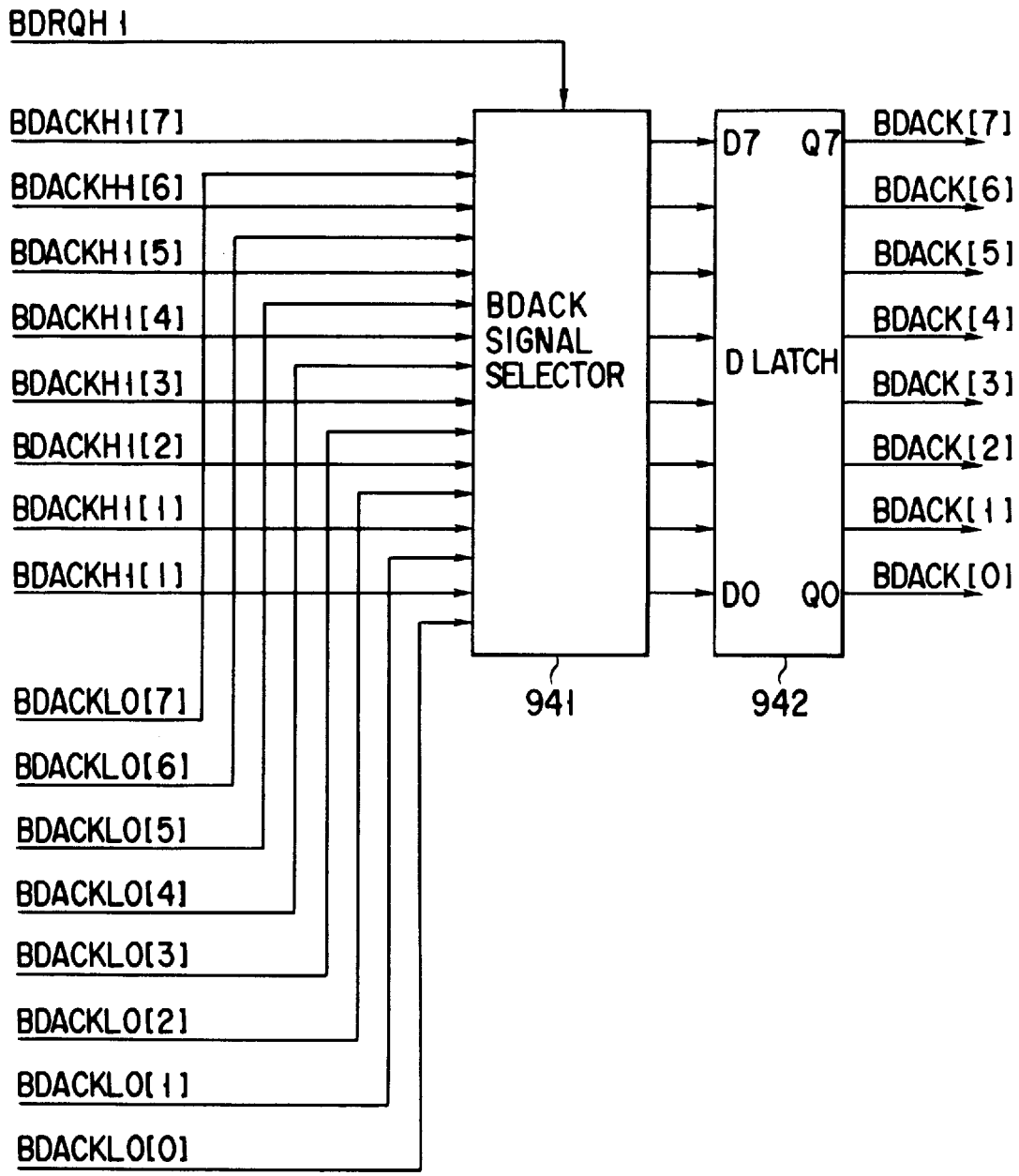
F I G. 29

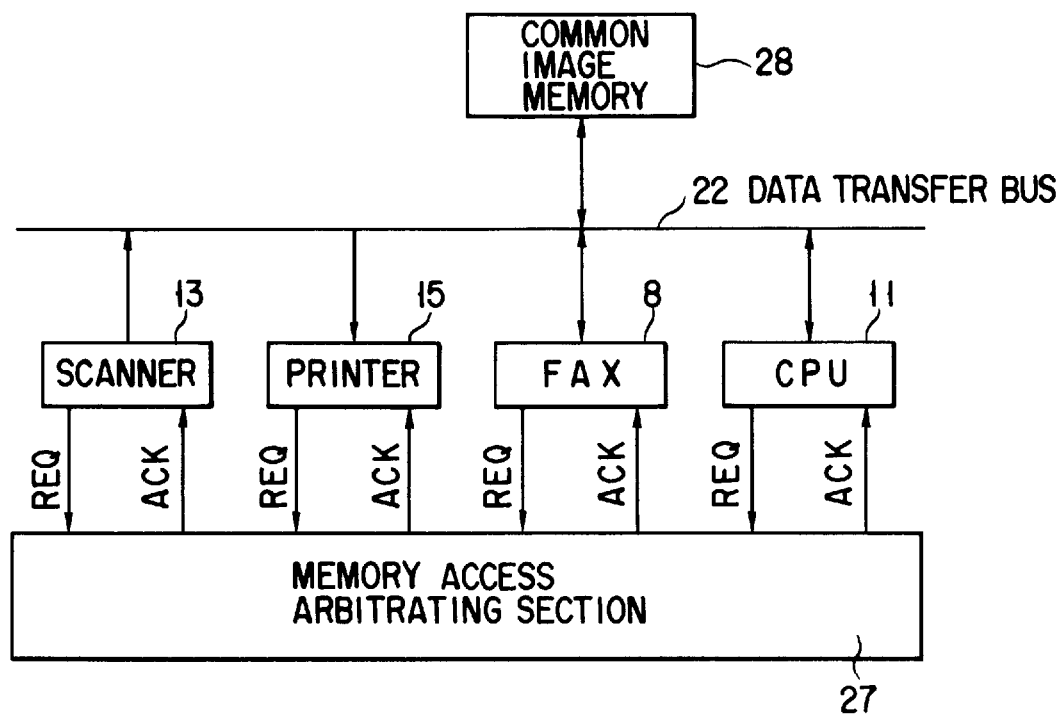
F I G. 30
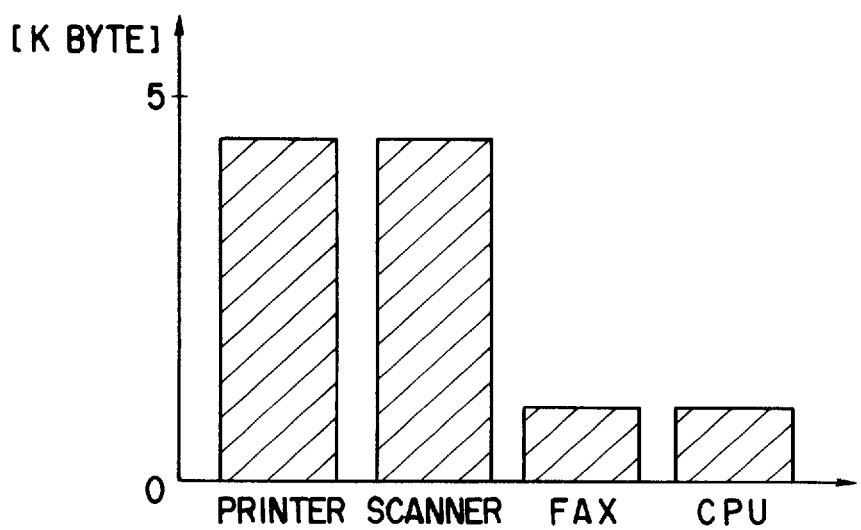
F I G. 31

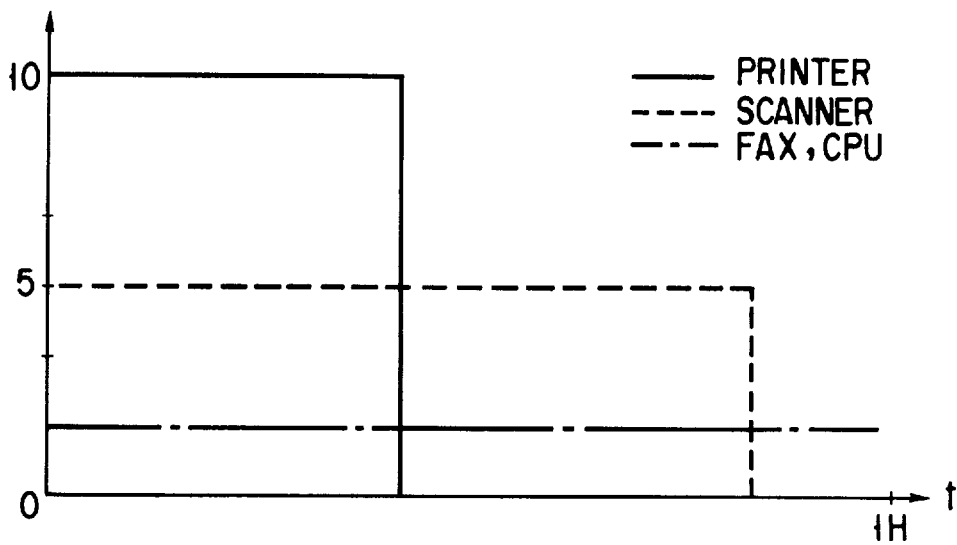
F I G. 32
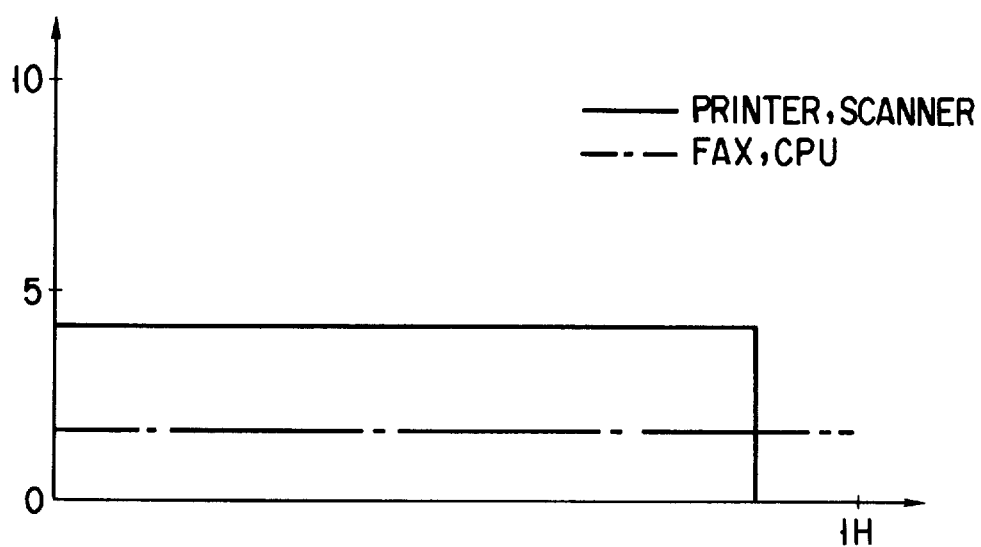
F I G. 33

CIRCUIT FOR CONTROLLING ACCESS TO A COMMON MEMORY BASED ON PRIORITY

BACKGROUND OF THE INVENTION

1. Field of the Invention

This invention relates to a common memory access control device which controls various access requests to a common memory shared by an plurality of devices differing from each other in access frequency, in an image forming apparatus such as a digital copier, and to an image forming apparatus using the control device.

2. Description of the Related Art

With the recent increasing memory capacity and decreasing memory cost, an image forming apparatus, such as a digital copier, that deals with multivalued image data in addition to binary image data, has been developed. The merits of multivalued image data are that tonal images can be handled and that high-definition images can be obtained which are free from jagged slant portions of a character or a line-drawing that develop in a binary image.

A memory-based process can be performed on these image data items. For instance, the images on manuscript sheets can be read sheet by sheet with a scanner and stored in a memory, and two sheets of images in the memory can be printed out on a sheet of paper. When the copier is provided with a facsimile (FAX) function, two pages of received images in the FAX may be printed out on a sheet of paper in a similar manner.

In the memory needed for these processes, the multivalued image data from the scanner, the binary image data from the FAX, and programs and data items for the CPU (central processing unit) supervising the entire control of the apparatus, can be treated as mere data, regardless of the format and contents of data.

In this way, by sharing a memory instead of differentiating memories according to the format and contents of data, it is possible to make effective use of hardware resources including a memory and a peripheral control unit for the memory.

The common memory cannot be accessed by a plurality of devices, such as a scanner and a FAX, at the same time. An access arbitrating section (access control section) generally arbitrates (controls) between the access requests of the individual devices to the common memory. On the basis of the arbitration result, a device is selected and the selected device is allowed to access the memory.

As described above, by arbitrating between the access requests of the individual devices and allocating the accessing order, the respective devices seemingly can access a single common memory in parallel at the same time.

The individual devices differ in the following: the frequency and timing of access request, urgent access permission on access request, a leeway to wait for, and the allowable waiting time.

For example, a scanner or a printer that requires the transfer of multivalued data has a high access request frequency, and once having started data transfer, it cannot stop the transfer until one page of data transfer has been completed.

Therefore, to effect data transfer in preference to the other devices, high priority is set at the access arbitrating section. In contrast, since the CPU and the FAX have a lower transfer capability and a lower access request frequency than the scanner and printer, low priority is set at the access arbitrating section.

In this way, by setting high priority and low priority at the access arbitrating section, data transfer can be effected without losing data, because even if an access request of the scanner or printer of high priority competes with that of the CPU or FAX of low priority, the scanner or printer of high priority is allowed to transfer data in preference to the other devices.

However, in a case where priority control is effected by allocating high priority and low priority to each device in a fixed manner, when high-priority devices with a high access frequency, such as the scanner or printer, intensively make access requests at a certain time, low-priority devices, such as the CPU or fax, can hardly make access.

Additionally, even if there are few high-priority access requests, the CPU or FAX cannot transfer data sufficiently, because they have a low data transfer capability.

Specifically, the conventional priority control has a disadvantage in that the efficiency of accessing the common memory decreases significantly, when high-priority access requests occur intensively in a certain period of time, or conversely when there are few access requests.

SUMMARY OF THE INVENTION

The foregoing object is accomplished by providing an access control apparatus comprising: a memory for storing data accessed by a first device and a second device; means for setting the order of priority in access to the memory for the first and second devices; means for selecting one device that can access the memory from the first and second devices according to the order of priority set by the setting means, when the requests of the first and second devices to access the memory have been accepted; and control means for accepting the access request of the device not selected by the select means in preference to the other, after a specified time has elapsed since the device selected by the select means started to access the memory means.

The foregoing object is also accomplished by providing an image processing apparatus comprising: first reception means for receiving image data from a first device; second reception means for receiving image data from a second device; a memory for storing the image data received by the first and second reception means; image processing means for effecting the image processing of the image data stored in the memory; means for setting the order of priority in access to the memory for the first and second devices; means for selecting one device that can access the memory from the first and second devices according to the order of priority set by the setting means, when the requests of the first and second devices to access the memory have been accepted; and control means for accepting the access request of the device not selected by the select means in preference to the other, after a specified time has elapsed since the device selected by the select means started to access the memory means.

With the access control apparatus of the present invention, there is provided control means which accepts an access request not selected, in preference to the others after a specified time has elapsed since access to the memory was started, instead of allocating high and low priorities in a fixed manner and performing priority control (arbitration) as a conventional equivalent did. Therefore, since there is no case where only a high-priority access request is accepted and a low-priority access is kept waiting for a long time, it is possible to improve the access efficiency.

Similarly, with the image processing apparatus of the present invention, there is provided control means which accepts an access request not selected, to allow access to the memory, even if it is a low-priority access request, after a specified time has elapsed since access to the memory was started. Therefore, it is possible to provide an image forming apparatus which enables access control of a common memory with an improved access efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram of the system expansion unit of FIG. 1;

FIG. 10 shows two-dimensional access to the page memory of FIG. 3 using linear addresses;

FIG. 11 is a block diagram of the data control circuit of FIG. 3;

FIG. 12 is a block diagram of the image processing circuit of FIG. 11;

FIG. 13 is a block diagram of the read data path section of FIG. 12;

FIG. 14 is a block diagram of the write data path section of FIG. 12;

FIG. 15 is a block diagram of the image data transfer control section of FIG. 11;

FIG. 21 is a connection diagram of signals used in the scanner input process, printer output process, and resolution conversion/compression process;

FIG. 23 is a block diagram of the transfer channel select circuit;

FIGS. 25A and 25B are detailed block diagrams of the priority setting circuit of FIG. 23;

FIG. 26 is a detailed block diagram of the high-priority control circuit of FIG. 23;

FIG. 29 is a detailed block diagram of the selector circuit of FIG. 23;

FIG. 30 is a conceptual diagram of the apparatus to help explain transfer control;

FIG. 31 is a diagram to help explain the amount of data transfer in a single line transfer period for each device;

FIG. 32 is a diagram to help explain the amount of data transfer at each time in a single line transfer period for each device when there is no competition between accesses; and FIG. 33 is a diagram to help explain the amount of data transfer at each time in a single line transfer period for each device when there is a competition between accesses and then access arbitration is made.

DETAILED DESCRIPTION OF THE PREFERRED EMBODIMENTS

Hereinafter, referring to the accompanying drawings, an embodiment of the present invention will be explained.

Figure 1:
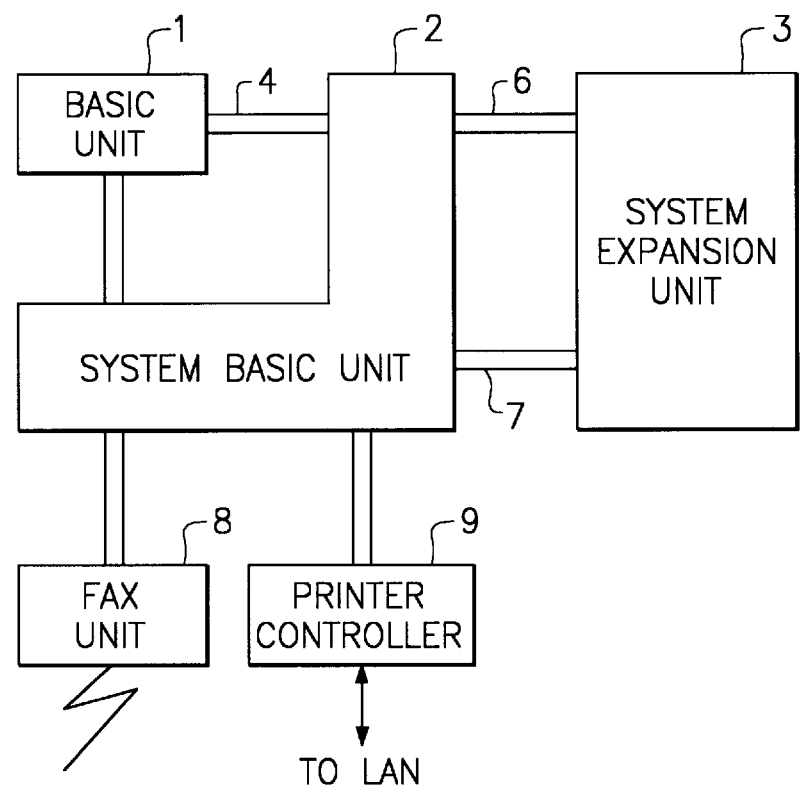
FIG. 1 is a general block diagram of an image forming apparatus, such as a digital copier, according to an embodiment of the present invention.

FIG. 1 schematically shows a general structure of an image forming apparatus, such as a digital copier, according to an embodiment of the present invention. The image forming apparatus comprises a basic unit 1 that executes basic copy functions, a system basic unit 2 that contains a page memory for temporarily storing image data in connecting to another system or storing image data in editing and processing image data and copying the results, and a system expansion unit 3 that contains an optical disk unit for electronically storing the image data inputted from the basic unit 1 semipermanently, and a control means for converting image data and control data into the control system and image format of another apparatus in exchanging image data and control data with another apparatus.

The basic unit 1 is connected to the system basic unit 2 via a basic section system interface 4 for control data exchange and a basic section image interface 5 for image data exchange.

The system basic unit 2 is connected to the system expansion unit 3 via an expansion section system interface 6 for control data exchange and an expansion section image interface 7 for image data exchange.

Namely, the basic unit 1 is not directly connected to the system expansion unit 3, and the exchange of control data and image data between these two units is invariably effected via the system basic unit 2.

The image forming apparatus may take three forms, depending on whether the system basic unit 2 and system expansion unit 3 are connected or not. Specifically, the first form is a configuration with the basic unit 1 only. A basic function in the configuration is a copy function, which enables a copying process involving simple editing processes including an enlarging/reducing process and a masking/trimming process.

The second form is a configuration where the basic unit is connected to the system basic unit 2. With this configuration, in addition to the copy function of the basic unit, editing processes including an image rotating process and an image combining process can be effected using a page memory for temporarily storing image data.

To the system basic unit 2, a FAX (facsimile) unit 8, and a printer controller 9 for using a printer for the basis unit 1 as a remote printer for a control unit such as an external personal computer can be connected in addition to the system expansion unit 3. The FAX unit 8 can transmit and receive image data to and from other systems and units via communication channels. The received image data is sent to the basic unit 1 and printed out on a printer described later.

The third form is a configuration where the basic unit 1, system basic unit 2, and system expansion unit 3 are connected as shown in FIG. 1. With this configuration, in addition to the functions in the first and second forms, the following functions can be performed: a data storage/management function of electronically storing image data semipermanently and managing the stored image data; a LAN-based image data transmitting/receiving function of transmitting image data from a local area network (LAN) channel control means (explained later) to other systems or units via LAN channels, and conversely receiving image data from other systems or units via LAN channels; and a printer function of converting the print control code sent from a personal computer via a general-purpose interface into image data, and printing out the image data on the printer of the basic unit 1 via the page memory of the system basic unit 2.

Figure 2:
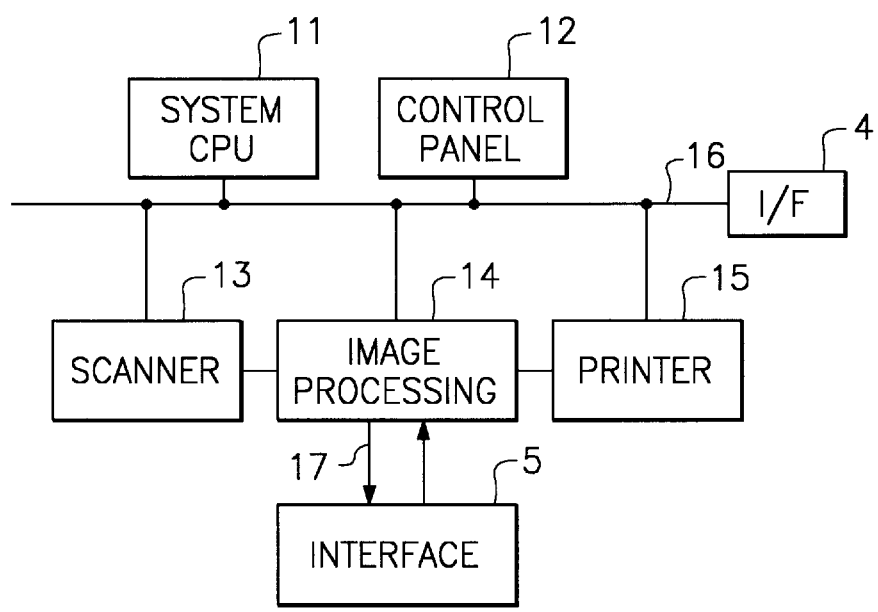
FIG. 2 is a block diagram of the basic unit of FIG. 1.

The basic unit 1, for example, as shown in FIG. 2, comprises a system CPU 11 composing the control section itself, a control panel 12 provided with an operator section and a display section, an image scanner 13 serving as an input means for reading images from a manuscript, an image processing circuit 14, and a printer 15 serving as an image forming means.

The system CPU 11 is connected to each of the control panel 12, scanner 13, image processing circuit 14, and printer 15 via a basic section system bus 16, and controls these units. The basic system bus 16 is connected to the basic system interface 4.

The scanner 13 contains a CCD line sensor (not shown) composed of a plurality of light-receiving elements arranged in a line. It reads the image from the manuscript sheet on a manuscript table (not shown) line by line under the control of the system CPU 11, converts the shades of the image into 8-bit digital data, and then outputs the data as time-sequential digital data together with a synchronizing signal to the image processing circuit 14.

The printer 15 is composed of an image forming section (not shown) which is a combination of a laser optical system (not shown) and an electrophotographic system capable of forming an image on transfer paper. Under the control of the system CPU 11, the printer receives the 4-bit digital image data from the image processing circuit 14 in synchronization with a synchronizing signal via a printer interface, and forms electrostatic latent images on a photosensitive material drum (not shown) using laser light whose pulse width is in proportion to the size of image data. Thereafter, it visualizes the electrostatic latent image using a visualizing means (not shown), transfers the visualized image onto transfer paper using a transferring means (not shown), fixes the image on the transfer sheet using a fixing means (not shown), and outputting the transfer sheet.

The control panel 12 is made up of an operator section for setting operation modes and parameters in the apparatus, and a display section for displaying system states or the image stored in the page memory of the system basic unit 2.

The system CPU 11 also controls each section of the system basic unit 2 as explained later.

Figure 3:
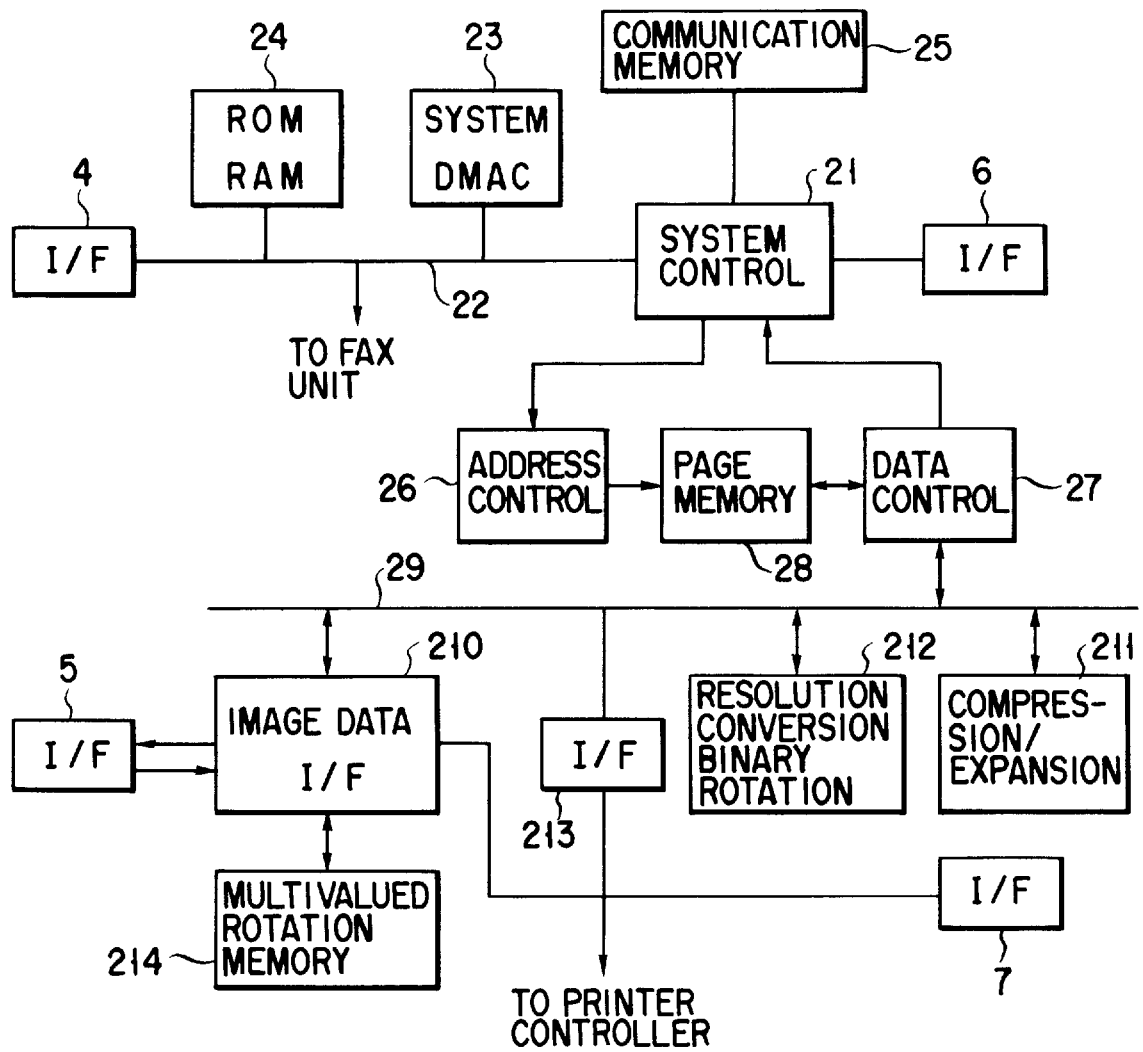
FIG. 3 is a block diagram of the system basic unit of FIG. 1.

The system basic unit 2, for example, as shown in FIG. 3, contains a page memory 28 for temporarily storing image data, a system control circuit 21 for controlling the communication of control data between the system CPU 11 in the basic unit 1 and the CPU in the system expansion unit 3 and also controlling the accessing of the basic unit 1 and system expansion unit 3 to the page memory 28, a page memory address control circuit 26 for generating addresses for the page memory 28, an image bus 29 for performing data transfer between the individual devices in the system basic unit 2, and a page memory data control circuit 27 for controlling data transfer between the page memory 28 and other devices via the image bus 29.

The system basic unit further contains an image data interface (I/F) 210 for interfacing image data when transferring image data to the basic unit 1 via the basic section image interface 5, a resolution conversion binary rotation circuit 212 for converting image data with the resolution of one unit into that with the resolution of another unit when transmitting image data to a unit with different resolution, also converting the image data from a unit with different resolution into that with the resolution of the printer 15 in the basic unit 1, and performing a 90-degree rotation process of binary image data, and a compression/expansion circuit 211 for compressing the input image data for a device that compresses image data for transmission or storage, such as facsimile transmission and optical disk storage, and expanding the compressed image data to visualize the data on the printer 15.

The system basic unit further contains a system memory (ROM/RAM) 24 composed of a font memory in which character fonts are stored, a work memory for temporarily storing the control data used by the system CPU 11, and a program memory in which programs needed for the system basic unit 2 to effect processing, a system DMA controller 23 for performing high-speed data transfer between the devices on the basic section system bus 16, and a printer controller interface 213 for interfacing the control data when the printer controller 9 exchanges control data with the system CPU 11, and also interfacing the image data when the printer controller 9 exchanges image data with the image bus 29.

The system basic unit further contains a communication memory 25 connected to the system control circuit 21 for storing control data when the system CPU communicates control data with the system expansion unit 3, and a multivalued rotation memory 214 connected to an image data interface (I/F) 210 which is used to rotate image data 90 or 180 degrees before the printer 15 prints out the image data.

The FAX unit 8 and printer controller 9 are optionally connected.

The system expansion unit 3, for example, as shown in FIG. 4, comprises an expansion CPU 31 for controlling each device in this unit via an expansion section system bus 43, an expansion DMA controller 32 for controlling data transfer on the expansion section system bus 43, a general-purpose ISA bus 44, an ISA bus controller 33 for interfacing the expansion section system bus 43 with the ISA bus 44, a hard disk unit 35 connected to the expansion section system bus 43 for electronically storing image data, a hard disk interface 34 serving as an interface for the hard disk unit 35, an optical disk unit 38 connected to the ISA bus 44 for electronically storing image data, an optical disk interface 37 serving as an interface for the optical disk unit 38, a local area network channel control unit (LAN) 41 for realizing a LAN function, a printer controller control unit 40 for realizing a printer function, a G4 FAX control circuit 39 with a G4 FAX control function, an expansion SCSI interface 42 used for connection with an SCSI specification device, an expansion section image bus 45 for outputting the image data from the printer controller control unit 40 to the system basic unit 2 via the expansion image interface 7, and a buffer memory 36 for interfacing the expansion section system bus 43 with the expansion section image bus 45.

The optical disk interface 37, optical disk unit 38, G4 FAX control circuit 39, printer controller control unit 40, local area network channel control unit 41, and expansion SCSI interface 42 are optional and can be installed on and removed from the system expansion unit 3.

The arrangement and function of the important portion of the system basic unit 2 will be explained in detail.

Figure 5:
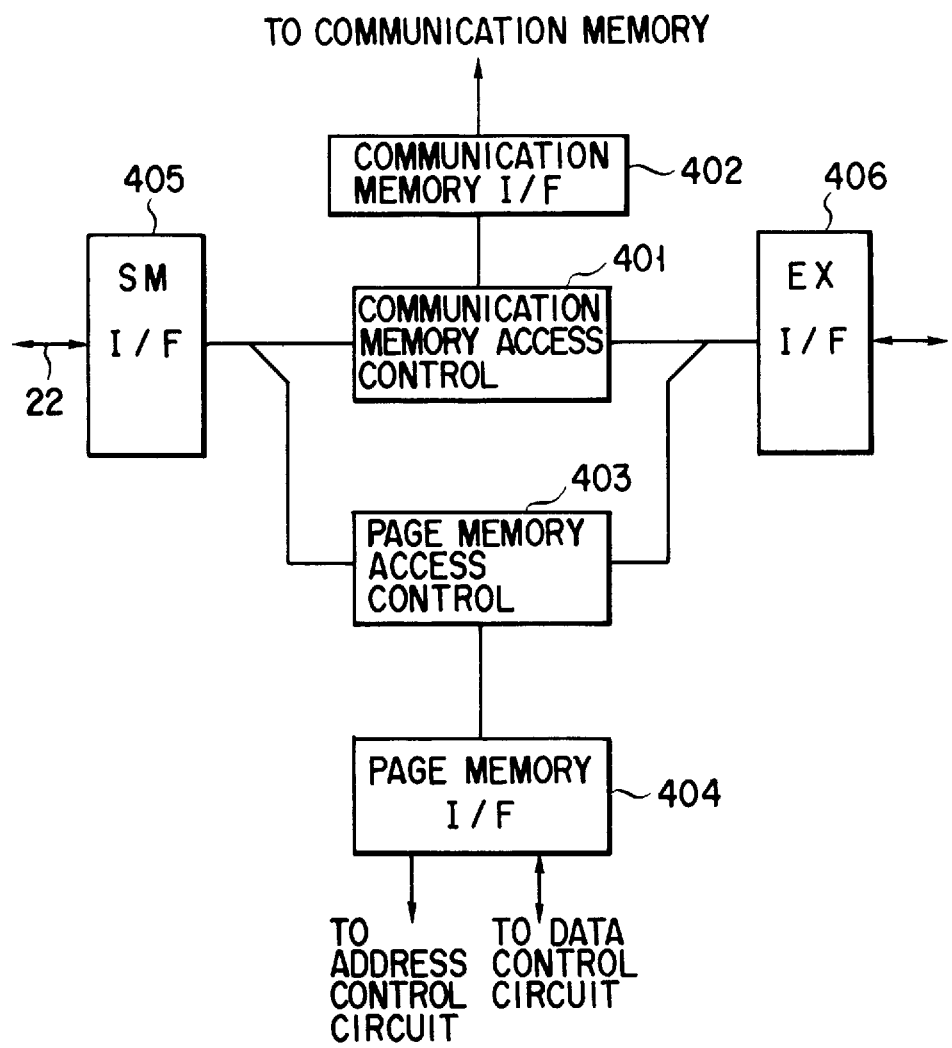
FIG. 5 is a block diagram of the system control circuit of FIG. 3.

The system control circuit 21, for example, as shown in FIG. 5, comprises a communication memory access control circuit 401 for controlling the communication of control data between the system CPU 11 and the expansion CPU 31, a communication memory interface 402 for interfacing with the communication memory 25, a page memory access control circuit 403 for controlling the accessing of the basic unit 1 and system expansion unit 3 to the page memory 28, a basic section system bus interface 405 for allocating the control data and image data sent together with an address from the system CPU 11 of the basic unit 1 via the basic section system but 16 to the block in the system basic unit 2 corresponding to the address, a system expansion bus interface 406 for allocating the control data and image data sent together with an address from the system expansion unit 3 to the block in the circuit corresponding to the address, and a page memory interface 404 for interfacing in image data exchange between the page memory access control circuit 403 and the page memory 28, when a device capable of accessing the page memory on the basic section system bus 16 (the CPU 11 and DMA controller 22 in the basic unit) or a device capable of accessing the page memory on the system expansion bus 43 (the CPU 31 and DMA controller 32 in the system expansion unit 3) access the image data in the page memory 28 via the respective system buses.

Figure 6:
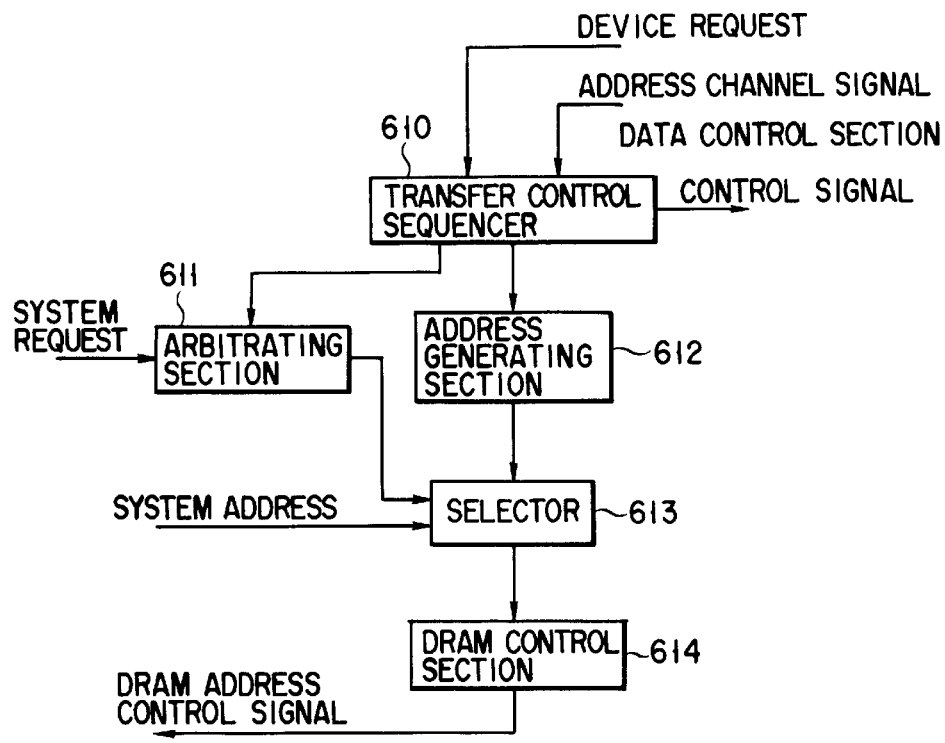
FIG. 6 is a block diagram of the address control circuit of FIG. 3.

The address control circuit 26 for generating addresses for the page memory 28, for example, as shown in FIG. 6, comprises a transfer control sequencer 610 for executing various types of transfer sequence at the request of the image bus, an arbitrating section 611 for arbitrating between the request of the image bus and the request of the system bus, an address generating section 612 for generating various types of memory addresses for a plurality of channels in transfer from the image bus, a selector 613 for switching between the address outputted from the address generating section 612 and the system address, and a DRAM control section 614 for generating an address and control signal for the DRAM.

The address control circuit 26 receives memory access requests from two routes of the image bus and the system bus. The arbitrating section 611 arbitrates between these requests, and the data transfer process is performed for the allowed request.

When the request of the system bus is allowed to access the memory as a result of the arbitration, the system address selected by the selector 613 is inputted to the DRAM control section 614. The DRAM control section 614 converts the inputted address into an address in the DRAM and also generates the control signals necessary for a read and a write operation.

The transfer control sequencer 610 receives both a request and an address channel signal from the image bus, and selects one of a plurality of address generators in the address generating section 612. When the request of the image bus is allowed to access the memory as a result of the arbitration, the address generating section 612 outputs an memory address for the selected channel, which is inputted to the DRAM control section 614.

Figure 7:
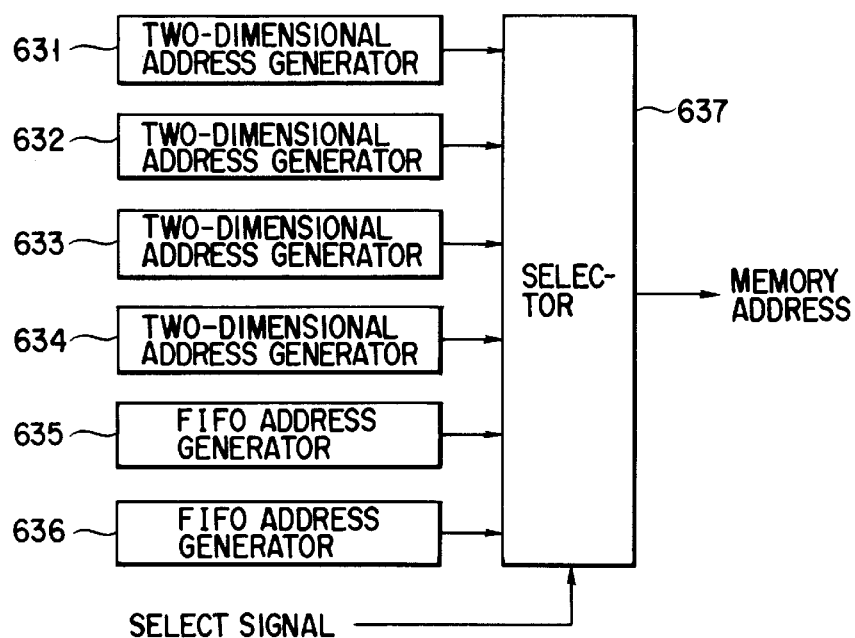
FIG. 7 is a block diagram of the address generating section of FIG. 6.

The address generating section 612, for example, as shown in FIG. 7, is made up of four channel two-dimensional address generators 631, 632, 633, 634, two channels of FIFO address generators 635, 636, and a selector 637 for selecting one of these generated memory addresses on the basis of the channel select signal from the transfer sequencer.

Figure 8A:
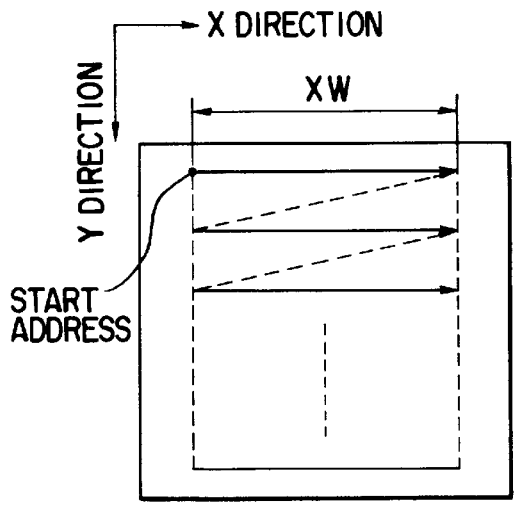
FIGS. 8A and 8B each illustrate the directions in which the address generating section of FIG. 6 generates addresses.
Figure 8B:
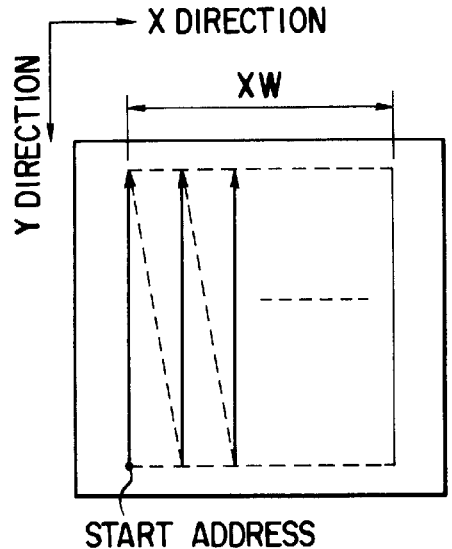

The two-dimensional generators 631 to 634 can generate various types of addresses. For instance, as shown in FIG. 8A, addresses can be generated one after another in the X direction in synchronization with the clock from the transfer control sequencer. As shown in FIG. 8B, by changing parameters, addresses can be generated one after another in the opposite direction to the Y direction.

The start address and the main scanning width of one line (XW) can be set arbitrarily according to the manuscript sheet size.

Use of two-dimensional address generators capable of generating various types of addresses enables transfer to any rectangular area in the page memory 28, rotation reading, and repetitive reading. Additionally, use of two channels of two-dimensional address generators provides image editing functions, including image movement between any areas in the page memory 28, rotation, length/breadth conversion, repetition, and mirror image.

The FIFO address generators 635, 636 generate the FIFO addresses needed to use the page memory 28 as an FIFO memory and the statuses necessary for FIFO control.

The statuses include FIFO full (where the FIFO area is filled with unread data), FIFO empty (where the FIFO is empty of unread data), and FIFO half (where the FIFO area is more than half filled with unread data). By reading the FIFO register from the system CPU 11, the amount of data and the empty capacity in the FIFO can be known.

By performing FIFO control using these statuses, the difference between transfer speeds or transfer timing can be absorbed by the FIFO memory when data is transferred from one device to another on the image bus 29 or from a device on the image bus 29 to the system bus 22, thereby enabling high-speed data transfer.

Each of the FIFO address generators 635, 636 can be used as a one-dimensional address generator for two channels, when not performing FIFO control.

Figure 9:
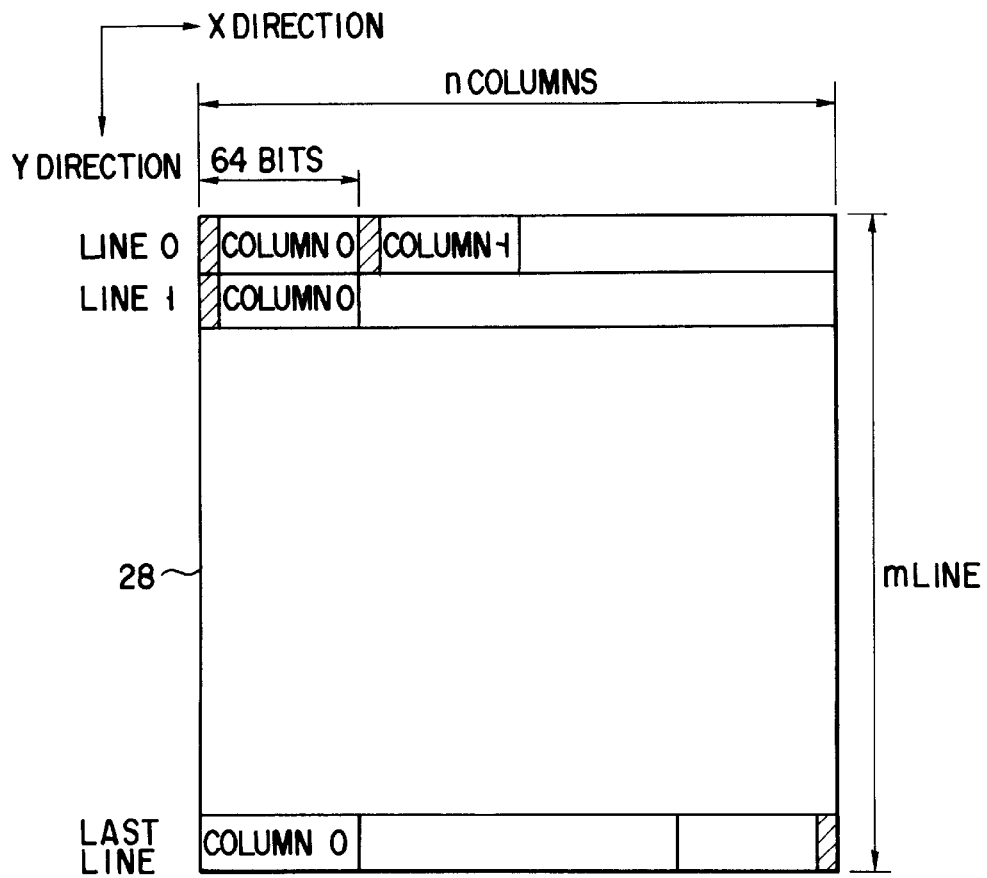
FIG. 9 is a conceptual diagram to help explain two-dimensional access to the page memory of FIG. 3.

FIG. 9 is a conceptual diagram to help explain two-dimensional access to the page memory 28. If the width of an access in the page memory 28 (64 bits in the figure) is one column, one line is composed of an integral multiple of one column. In the same line, consecutive columns in the X direction have consecutive linear addresses in the page memory 28, with the linear address of the last column in the line being continuous with the linear address of the first column in the next line.

FIG. 10 shows the result of writing the two-dimensional memory in the page memory 28 of FIG. 9 in the form of linear addresses.

The data control circuit 27, for example, as shown in FIG. 11, comprises an image data transfer control section 701 for controlling the data transfer between devices on the image bus 29 in the system basic unit 2 and the data transfer between a device on the image bus 29 and the page memory 28, an image processing section 702 for executing bit block transfer and various raster operations (logical operations), a system interface 703 for interfacing data when the CPU 11 in the basic unit 1 or the CPU 31 in the system expansion unit 3 accesses (reads from or writes into) the page memory 28 via the system control circuit 21, a selector 704 for selecting either the data from a device on the image data bus 29 sent via the image data transfer control section 701 or the data from the CPU (the CPU 11 in the basic unit 1 or the CPU 31 in the system expansion unit 3) sent via the system interface (I/F) 703 on the basis of the result of the page memory address arbitration at the address control circuit 26 in the process of writing into the page memory 28, and a selector 705 for selecting either the sending of data to a device on the image bus 29 via the image data transfer control section 701 or the sending of data to the CPU (the CPU 11 in the basic unit 1 or the CPU 31 in the system expansion unit 3) via the system interface 703 on the basis of the result of the page memory address arbitration at the address control circuit 26 in the process of reading from the page memory 28.

The image processing section 702, for example, as shown in FIG. 12, is made up of data path sections 710, 711, a selector 712, a parameter register 713, an image interface 714, an memory interface 715, a control bus interface 716, and an address control circuit interface 717.

In the image processing section 702, a path (the data path section 710) for reading data from the page memory 28 is independent from a path (the data path section 711) for writing. The respective paths perform a pipeline process, and consequently the maximum transfer cycle is the same for both of the reading and writing operations. This enables up to four channel parallel processing.

The selector circuit 712 switches data output direction, depending on whether the page memory access from a device on the image bus 29 is either a read access or a read modify write access.

In a read access, the data from the page memory 28 is outputted to the data path section 710, which sends it to a device on the image bus 29 via the image data transfer control section 701.

In a read modify write access, the data from the page memory 28 is outputted to the data path section 711, which performs a logical operation process of the just received data and the data sent from a device on the image bus 29 via the image data transfer control section 701 and selector 704. The result is written into the page memory 28.

The parameter register 713 is a register for storing the operation mode of the data path sections 710, 711 for each channel. These parameters are outputted to either the data path section 710 or section 711 on the basis of the page memory address sequence signal and channel select signal from the address control circuit 26. The data path sections 710, 711 execute various logical operations on the basis of these parameters.

FIG. 13 shows the structure of the data path section 710. Numeral 720 indicates a latch and 721 a one-term operation section for inverting 0s and 1s in data. The operation section 721, when the setting in the parameter register is "inversion on", converts a bit of 1 in the input data into a bit of 0, and a bit of 0 into a bit of 1.

A bit right-left reversing section 722 reverses the bit train ranging from the most-significant bit (MSB) to the least significant bit (LSB) read from the page memory 28. That is, the reversing section 722 is used for a 90-degree counter-clockwise rotation and a 180-degree rotation process.

A pipeline register 723 is a register for temporarily storing data when the beginning is not in the boundary of data width of the page memory 28 in a rectangular read access to the page memory 28.

A barrel shifter 724 shifts a data bit train toward the most-significant bit or the least-significant bit. When the beginning is not in the boundary of data width in the page memory 28, the barrel shifter, together with the pipeline register 723, shifts the bits in the current access so that the remaining bit in the preceding data stored in the pipeline register 723 may be continuous with the data bit train in the current access, and outputs the result as a 32-bit data train.

A bit expansion section 725 converts binary data (one bit per pixel) into multivalued data.

FIG. 14 shows the structure of the data path section 711. Numerals 726, 727, 728 indicate latches, 729 a bit right-left reversing section, 730 a pipeline register, 731 a barrel shifter, and 732 a bit expansion section. These have the same functions as those of the latch, the bit right-left reversing section, the pipeline register, the barrel shifter, and the bit expansion section, respectively.

Like the data path section 710, a two-term operation section 733 inverses data and, in the read modify write mode, performs logical operations (including OR operation, AND operation, and EXCLUSIVE-OR operation) on the data read from the page memory 28 and the data inputted via the image data transfer control section 701 to combine them, and outputs the result to the page memory 28.

Explained next will be the control of the image data transfer control section 701. There are two transfer modes for image data controlled by the image data transfer control section 701. One mode is of data transfer between input/output devices on the image bus 29 of the system basic unit 2, with the source (the transfer originating point) and the destination (the transfer terminating point) on the image bus 29, and consists of two cycles: a read cycle in which data is read from the source into the data buffer in the image data transfer control section 701 and a write cycle in which the data in the data buffer is written into the destination.

The other mode is of data transfer between an input/output device on the image bus 29 of the system basic unit 2 and the page memory 28, and consists of a data transfer cycle in which data is transferred between the input/output device and the image data transfer control section 701 and a data transfer cycle in which data is transferred between the data buffer and the page memory 28.

The portion between the page memory 28 and the data buffer is independent from the image bus 29, so that the two cycles can operate in parallel.

The image data transfer control section 701 can specify eight channels of data transfer of the aforementioned two types, and therefore can transfer data through eight channels simultaneously.

The image data transfer control section 701, for example, as shown in FIG. 15, comprises a data buffer 740, an image bus priority control section 741, an image bus timing control section 742, a page memory priority control section 743, a page memory timing control section 744, a terminal counter 745, an interrupt control section 746, a control bus interface 747, a parameter register 748, and an input/output (I/O) buffer 749.

The data buffer 740 contains as many data registers for temporarily storing the data transferred from the source as the number of channels.

The image bus priority control section 741 receives the data transfer request (BDRQ) from a device on the image bus 29, determines which device should be allowed to transfer data, by specific priority control, and tells the allowed device to start data transfer (BDAK).

The image bus timing control section 742 generates a timing signal for data transfer between the source device determined on the basis of the priority control result at the image bus priority control section 741 and the destination device, and outputs the timing signal to the image bus 29.

Figure 16:
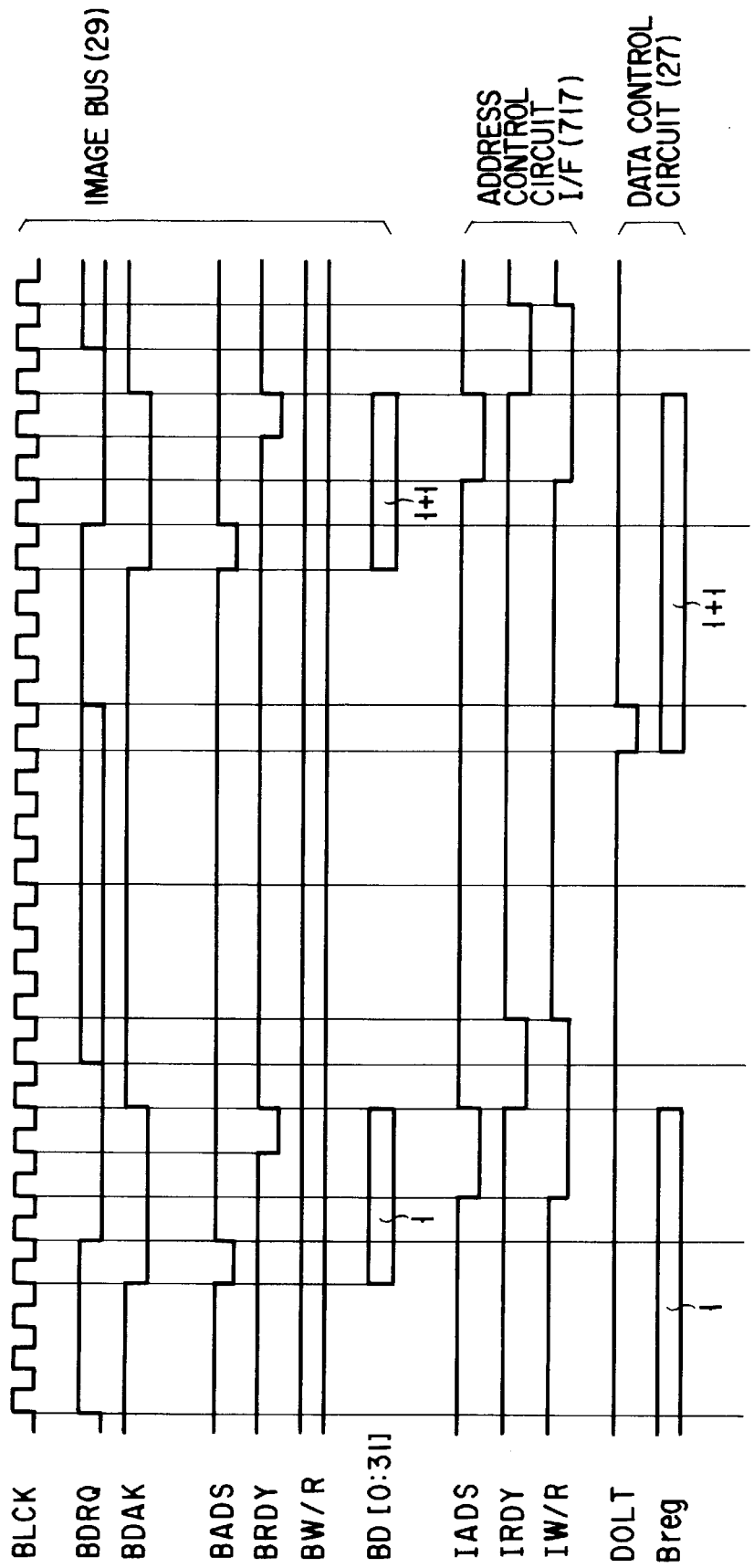
FIG. 16 shows data transfer timing on the image bus in transferring data from the page memory to the input/output device.
Figure 17:
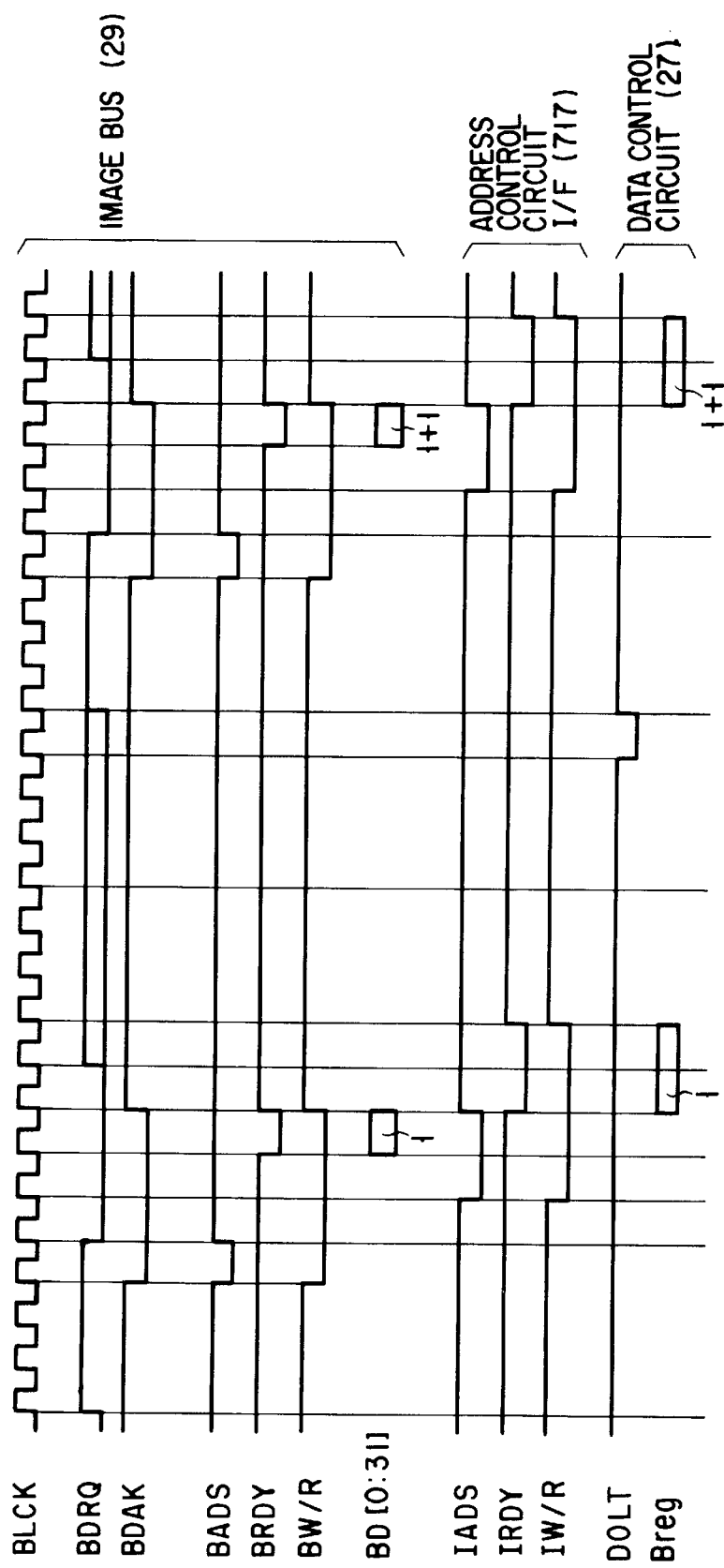
FIG. 17 shows data transfer timing on the image bus in transferring data from the input/output device to the page memory.

FIG. 16 shows data transfer timing on the image bus 29 when the page memory 28 transfers image data to the input/output device. FIG. 17 shows data transfer timing on the image bus 29 when the input/output bus transfers image data to the page memory 28.

BDRQ is a data transfer request signal for each device. Receiving a BDRQ signal, the image bus priority control section 741 starts an arbitrating operation. The BDAK signal is the arbitration result outputted from the image bus priority control section 741. A device whose BDAK signal goes active is allowed to transfer data. BADS is a transfer start signal. BW/R is a signal indicating whether access to a device is for reading or writing. BRDY is a data transfer end signal.

The page memory priority control section 743 receives the request signal from the data buffer 740, and determines a data transfer channel between the page memory 28 and the data buffer 740 on the basis of specific priority.

The page memory timing control section 744 generates a timing signal for data transfer between the page memory 28 and the data buffer 740 on the transfer channel determined on the basis of the priority control result at the page memory priority control section 743. The timing signal is outputted to the address control circuit 26. The transfer request signal from the data buffer 740 is outputted to the page memory priority control section 743 in the process of writing into the page memory 28 when the data from a device on the image bus 29 is stored in the data buffer 740, and in the process of reading data from the page memory 28 when no data is stored in the data buffer 740.

The terminal counter 745 counts the number of transferred bytes for each channel, and outputs a data transfer end signal (BTC) via the image bus timing control section 742 to the transfer channel for which the number of transferred bytes has reached the preset value. When the number of transferred bytes is set at the preset value, the interrupt control section 746 can interrupt the CPU 11 of the basic unit 1 via the control bus interface 747 and the basic section system bus 16, to terminate the transfer.

The parameter register 748 is a register in which the transfer originating point, transfer terminating point, the number of transferred bytes, and the presence/absence of an interrupt process at the end of transfer are set.

The image bus 29 has a data width of 32 bits, and always transfers 32 bits of data, regardless of a bit width of one pixel. For instance, when the scanner 13 writes binary data (one bit per pixel) into the page memory 28, 32 pixels of data are transferred simultaneously over the image bus 29 from the image data interface 210 to the page memory 28 via the image data transfer control section 701. When multivalued data (4 bits per pixel) is written into the page memory 28, eight pixels of data are transferred over the image bus 29 simultaneously. Forming 32-bit data is effected at each device on the image bus 29 according to the number of bits per pixel.

In data transfer priority control on the image bus, priority is determined according to the nature of a device in such a manner that the transfer request from a device incapable of suspending data transfer or keeping data transfer waiting (as in the process of outputting to the printer 15 or inputting from the scanner 13) is accepted in preference to other devices, whereas the request from a device capable of keeping data transfer waiting, as in the compression/expansion process or the resolution conversion process, is accepted only when there is no transfer request from a higher-priority device.

Explained next will be the image data interface 210, which causes a device on the image bus 29 to interface image data transferred between the page memory 28 and the scanner 13 or printer 15, determines sets of pixels into which the image data inputted pixel by pixel from the scanner 13 is grouped according to the number of bits per pixel, always converts the data into the data width of the image bus 29, or 32-bit data, outputs the result onto the image bus 29, divides the 32-bit image data inputted from the image bus 29 into one-pixel units, and outputs these pixel units on the printer 15.

In summary, the image data interface 210 exchanges image data with the image processing circuit 14 and with the printer controller 9. The image data exchange with the image processing circuit 14 and with the printer controller 9 is effected via the page memory 28 and the 32-bit image bus 29.

Figure 18:
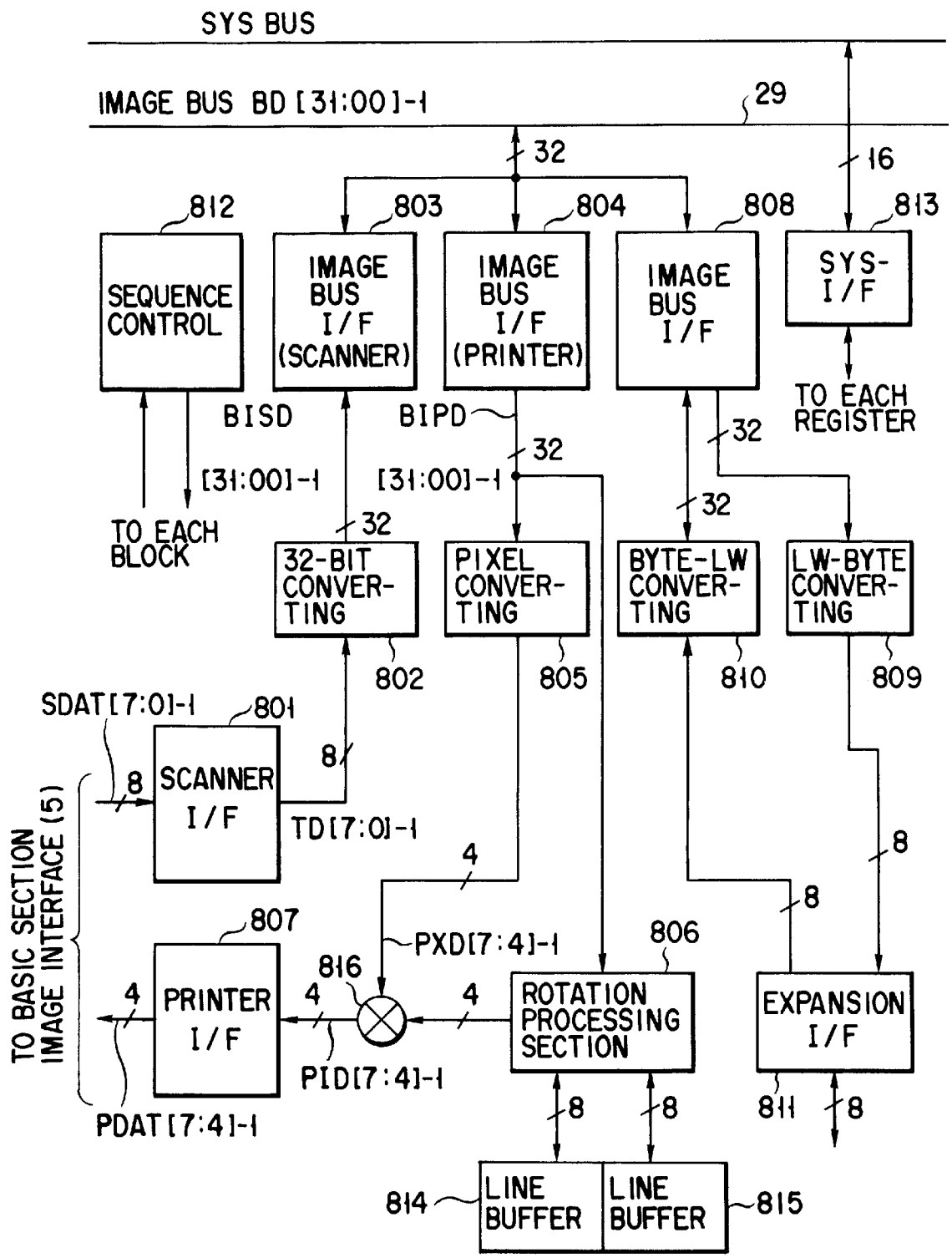
FIG. 18 is a block diagram of the image data interface of FIG. 3.

The image data interface 210, for example, as shown in FIG. 18, comprises a scanner interface 801 for receiving the scanner image data transferred from the image processing section 14, a 32-bit converting section 802 for selecting the inputted scanner image data in units of bits per pixel and converting the selected data items into 32-bit image data to output onto the image bus 29, a scanner image bus interface 803 for transferring the 32-bit image data generated at the 32-bit converting section 802 to the page memory 28 via the image bus 29, a printer image bus interface 804 for receiving the printer image data in the page memory 28 transferred via the image bus 29 in units of 32 bits, a pixel converting section 805 for converting 32 bits of the printer image data transferred to the image bus interface 804 in units of bits per pixel, a rotation process section 806 for rotating the printer image data from the page memory 28 clockwise through 90 degrees and outputting the result in units of bits per pixel, a printer interface 807 for outputting the printer image data from the rotation process section 806 to the image processing circuit 14, an image bus interface 808 for transferring the expansion interface image data to the page memory 28 via the image bus 29 in units of 32 bits, an LW→byte converting section 809 for changing the 32-bit image data inputted to the image bus interface 808 in units of eight bits, a byte→LW converting section 810 for changing the 8-bit image data from the expansion interface 811 into 32-bit image data, an expansion interface 811 for transferring the input/output image data to the page memory 28 in units of eight bits, a sequence control section 812 for controlling the entire action of the image data within the image data interface 210, and an SYS interface 813 for writing and reading operation settings and states into and from each block.

Explained next will be a simultaneous parallel operation.

The image forming apparatus can perform a plurality of processes simultaneously that do not compete with each other for devices used (the scanner 13, printer 15, compression/expansion circuit 211, and resolution conversion binary rotation circuit 212).

For example, such processes include the process of inputting image data from the scanner 13 to the page memory 28, the process of outputting the image data in the page memory to the printer 15, and the resolution conversion/compression process of resolution-converting the image in the page memory 28 and then compressing the converted image to store the image data in the optical disk unit 38. Since these processes do not compete with each other for devices used, they can be processed in parallel simultaneously.

As an example, explanation of the simultaneous parallel processing of the following three processes will be given: the scanner input process (scanner 13→image processing circuit 14→image data interface 210→data control circuit 27→page memory 28), the printer output process (page memory 28→data control circuit 27→image data interface 210→image processing circuit 14→scanner 13), and the resolution conversion/compression process (page memory 28→data control circuit 27→resolution conversion binary rotation circuit 212→data control circuit 27→compression/expansion circuit 211→data control circuit 27→page memory 28).

The image bus 29 has a single master structure where only the data control circuit 27 on the image bus becomes a master. Each input/output device activates the DMA transfer request (BDRQ) signal to make a request to the master for DMA transfer.

The master arbitrates between the DMA requests of the individual input/output devices, sends a DMA response (BDAK) signal to permit DMA transfer to only one input/output device, and transfers data.

Figure 19:
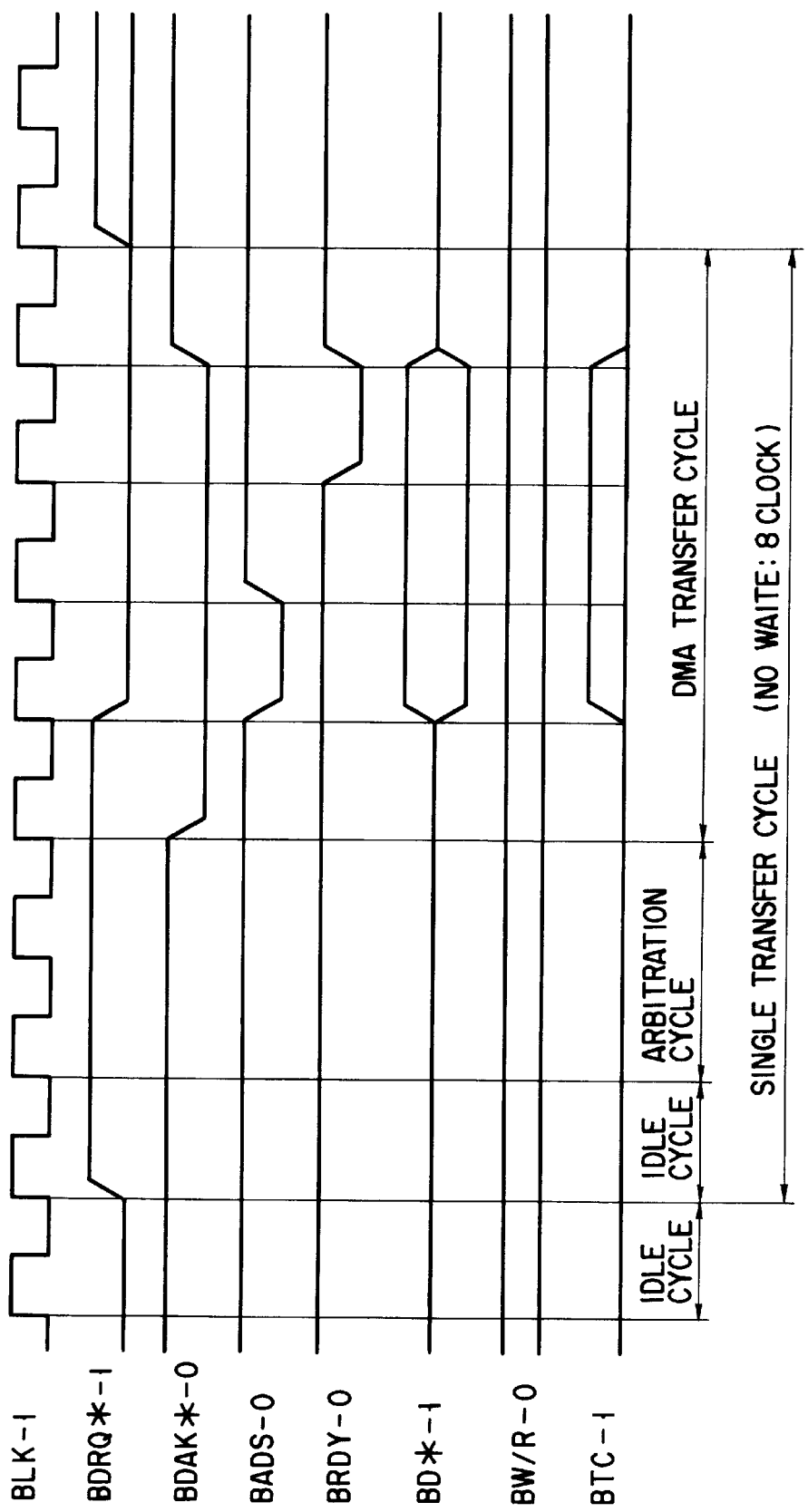
FIG. 19 shows basic data transfer timing when priority control need not be effected.
Figure 20:
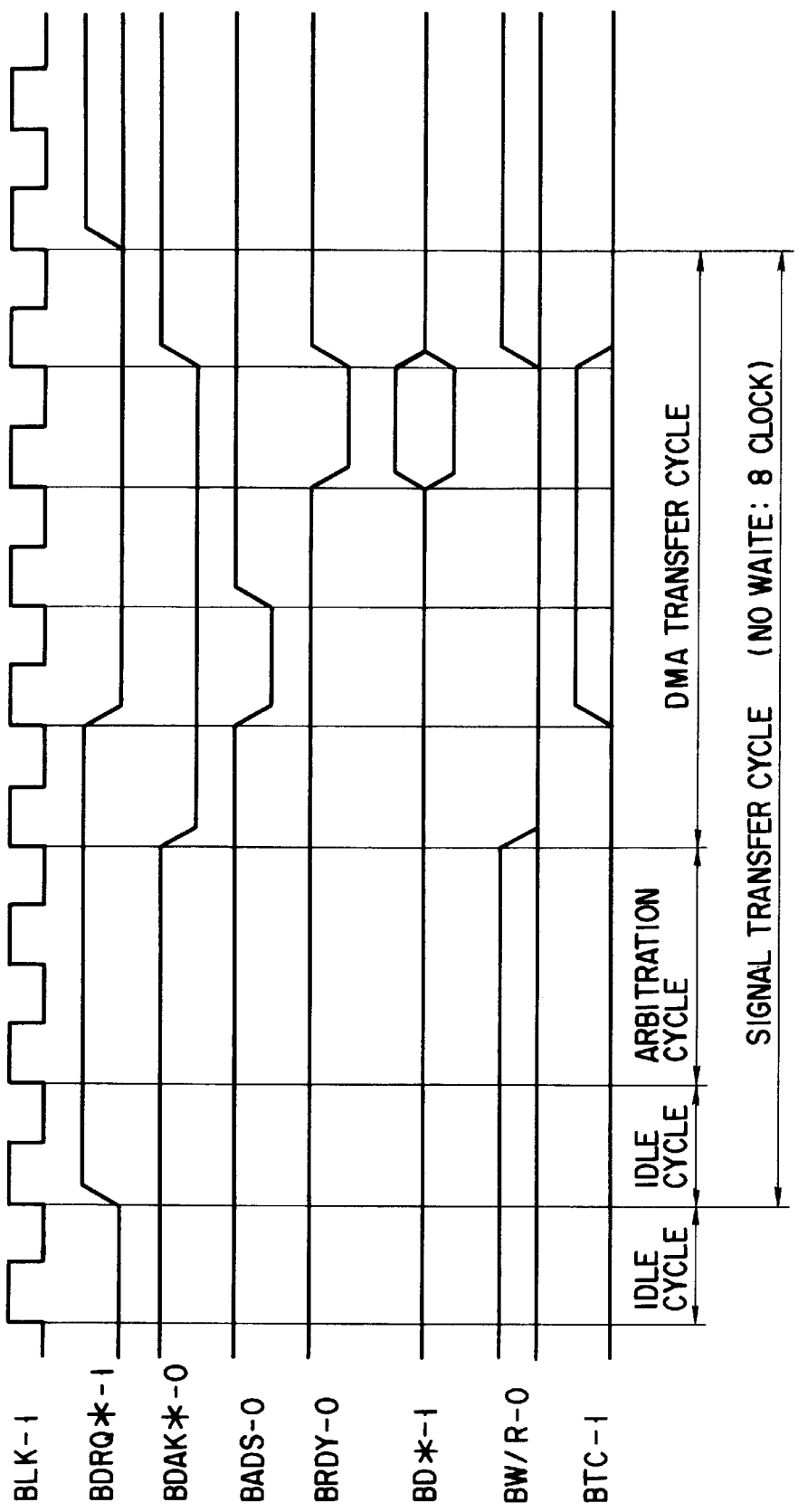
FIG. 20 shows basic data transfer timing when priority control need not be effected.

Basic data transfer timing in a case where priority control is not necessary because only one DMA transfer request signal is used, is shown in FIGS. 19 and 20. FIG. 21 is a diagram of the connection of the respective devices for the scanner input process, printer output process, and resolution conversion/compression process to the DMA transfer request (BDREQ) signals and DMA response (BDACK) signals of the data control circuit 27.

The correspondence between the individual devices and the DMA transfer request signal channels is as follows: BDRQ0-1 channel corresponds to output to scanner 13, BDRQ1-1 channel to input to printer 15, BDRQ2-1 channel to output to resolution conversion binary rotation circuit 212, BDRQ3-1 channel to input to resolution conversion binary rotation circuit 212, BDRQ4-1 channel to output to compression/expansion circuit 211, BDRQ5-1 channel to input to compression/expansion circuit 211, BDRQ6-1 channel to output to expansion section image bus 45, and BDRQ7-1 channel to input to expansion section image bus 45.

When these three processes are started simultaneously, image data is subjected to a time-division process and the resulting data is transferred over the image bus. Priority control of data transfer is performed at the image bus priority control section 741 in the data control circuit 27 on the basis of the DMA request signal from each device. In the priority control, a DMA response signal (BDACK) is outputted to only one device.

A detailed explanation of the image bus priority control section 741 will be given.

The image bus priority control section 741 can specify high priority or low priority for each channel. When more than one transfer channel makes a transfer request at the same time, the priority control section permits a transfer channel specified for high priority to transfer data in preference to a transfer channel specified for low priority. When transfer requests of transfer channels of the same priority (those of high priority or those of low priority) compete with each other, the control section permits the device selected according to specified priority control rules (explained later) to transfer data.

High priority is specified for such devices as the scanner 13 or printer 15, which cannot stop image data transfer temporarily, and must transfer data in a specific period.

In devices other than the scanner 13 and printer 15, a process using the compression/expansion circuit 211 and resolution conversion binary rotation circuit 212, or the resolution conversion/compression process, receives data from and outputs data to the page memory 28. Therefore, in such a device, unlike the scanner 13 or the printer, the data transfer time is not limited, so that the device is caused to stop data transfer temporarily in the course of operation, thereby assuring the image data transfer of a high-priority device.

Figure 22A:
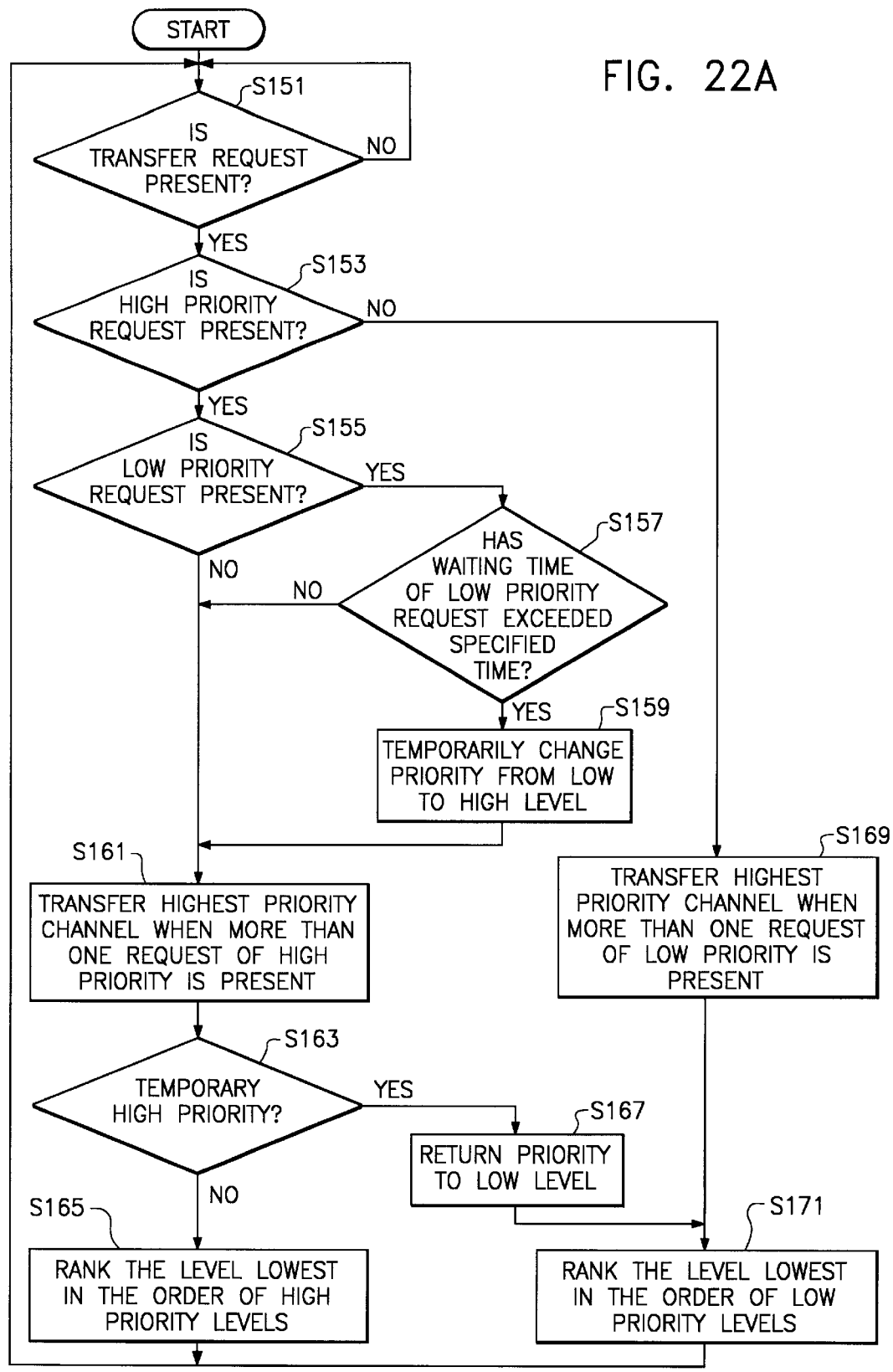
FIGS. 22A and 22B are flowcharts to help explain the priority control process at the image bus priority control section.
Figure 22B:
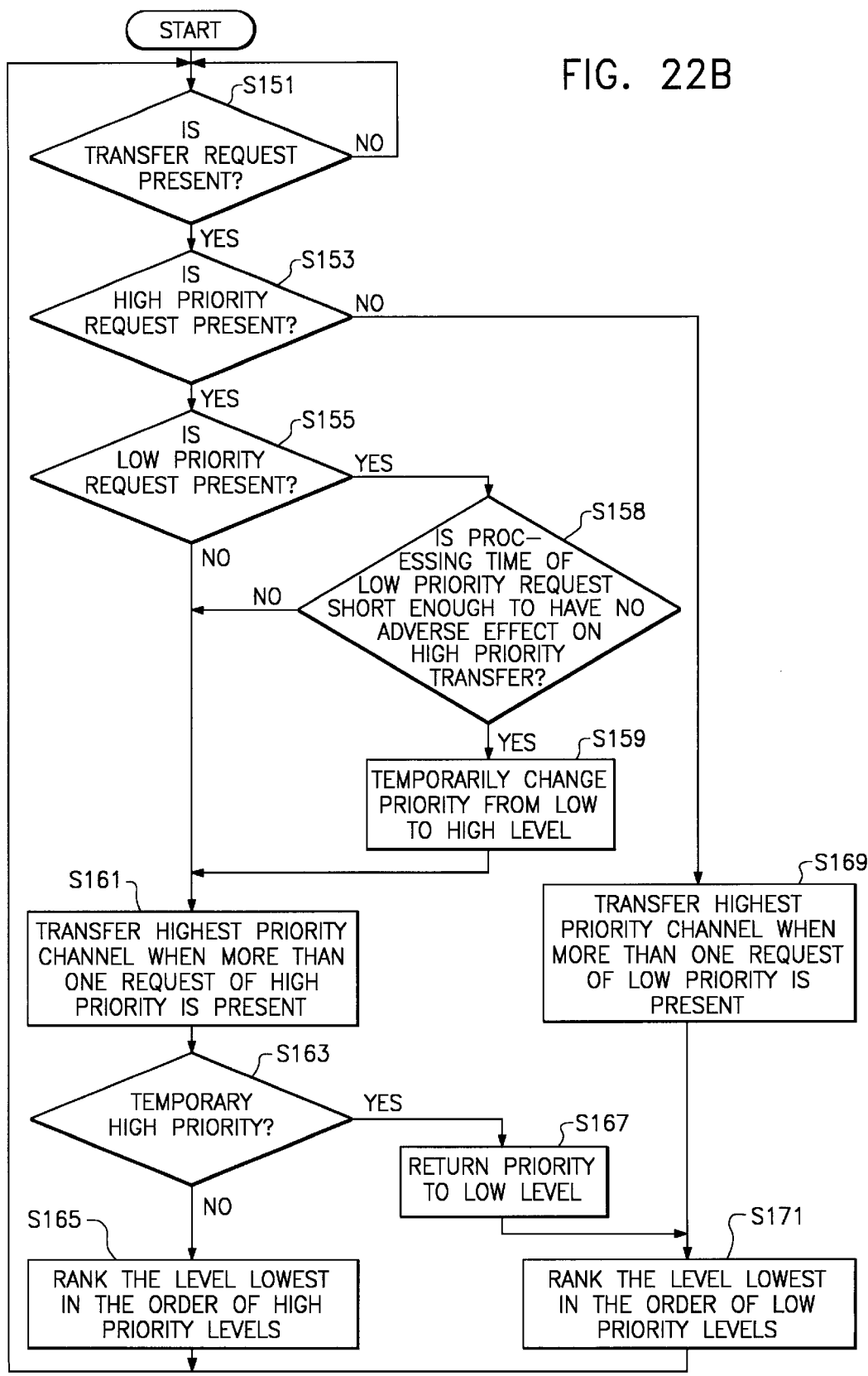

FIGS. 22A and 22B are flowcharts for the procedure of priority control by the image bus priority control section 741. First, a check is made to see if there is a DMA transfer request of a device. If there is no request, control does not proceed to a subsequent process, but waits for a request to arrive (S151).

If requests are present and they are of low priority only (S153), the request of the highest priority among these requests is allowed for a transfer cycle (S169). After the transfer has finished, the priority of the device that has just transferred data is ranked lowest in the order of low priority levels (S171).

If requests are present, no low-priority requests are found (S155), and these requests have high priority, the request of the highest priority among these requests is allowed for a transfer cycle (S161). After the transfer has finished, the priority of the device that has just transferred data is ranked lowest in the order of high priority levels (S165).

At this time, if there is a request of low priority (S155), a check is made to see how long the request has been kept waiting since it was made (S157). When the waiting time has exceeded the specified time, the priority of the request is temporarily changed from low to high priority (S159). Therefore, even if there are other requests of high priority, the request is certainly accepted after several rounds, because arbitration is made between the requests of high priority according to round robin rules. After the request of temporary high priority has been accepted (S163) and transferred, the priority is returned to the original low priority (S167), and ranked lowest in the low-priority round robin (S171).

In the embodiment of FIG. 22B, instead of considering whether or not a request of low priority has exceeded a specified time (S159), whether or not the processing time of a request of low priority is short enough to have no adverse effect on the transfer of high-priority data is considered. If the processing time is short enough, the priority of the request is temporarily changed from low to high priority, and is allowed to transfer data (S161).

Specifically, in the embodiment of FIG. 22B, instead of allocating high and low priority in a fixed manner and performing priority control (arbitration) as found in a conventional equivalent, as long as an access request of low priority meets the requirements for being processed in a time short enough to have no adverse effect on data transfer by a high-priority device (such as a scanner or printer), that is, the requirements for transferring all of the necessary data in 1 H (one scanning line period) while allowing a high-priority device to continue operation properly without losing any data, the priority of the request is changed from low to high priority at the priority changing means (S159) even if high-priority accesses are present. By accepting access requests of low priority at a suitable rate, access requests of high priority will not be concentrated in a certain period of time, but be averaged. Therefore, the amount of data transferred by a low-priority device with a low data transfer capability can be improved.

FIG. 23 is a block diagram of a transfer channel select circuit, which is made up of a priority setting circuit 931, priority control circuits 932, 933, and a select circuit 934. First, the priority setting circuit 931 sorts request signals into high-priority request signals and low-priority request signals. The priority control circuits 932, 933 arbitrate between the sorted request signals according to their respective priority, on the basis of round robin rules.

When high-priority request signals are present, the high-priority control circuit 932 makes arbitration decisions and outputs the arbitration result as a transfer channel via the select circuit 934. At this time, the low-priority control circuit 933 does not operate at all. If there is not a single high-priority request signal, and there are low-priority request signals, the low-priority control circuit 933 makes arbitration decisions and outputs the arbitration result as a transfer channel via the select circuit 934.

Figure 24:
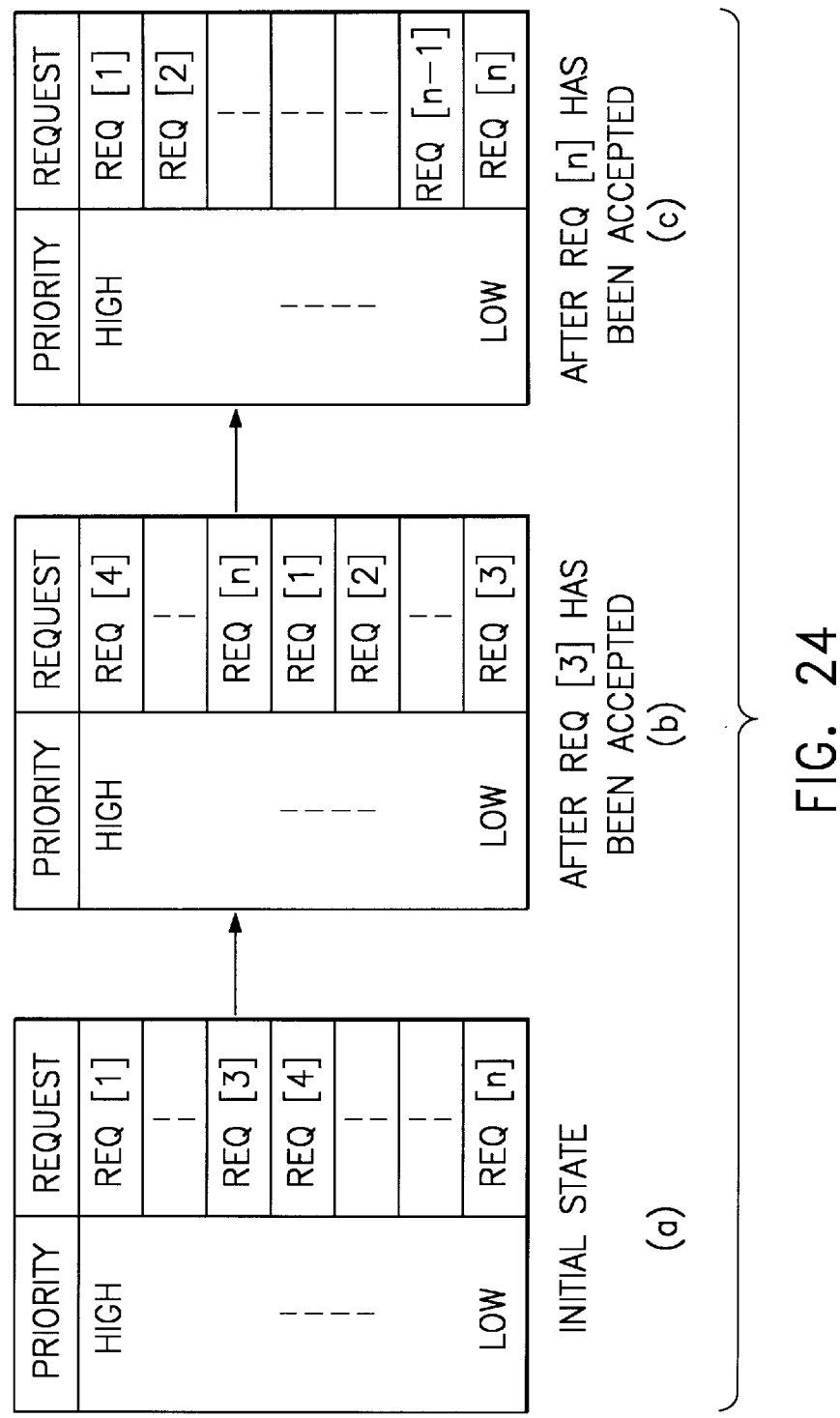
FIG. 24 is an explanatory diagram for priority transition by the round robin rules within the same priority.

FIG. 24 shows the transition of priority within the same level of priority when arbitration decisions are made according to round robin rules. In the figure, (a) indicates the initial state, (b) indicates the state after REQ[3] has been accepted, and (c) indicates the state after REQ[n] has been accepted. Namely, the priority of a device that has executed data transfer ranks lowest in the next arbitration cycle. When more than one request occurs in the same level of priority, they are selected in sequence according to the order of priority levels, so that each channel is given an access right.

FIG. 25A is a block diagram of the priority setting circuit 931, which is composed of a priority select circuit 961, an OR circuit 962, a comparator 964, and a waiting time counter 966. FIG. 25A shows a circuit for a single request channel. Actually, each channel is provided with the same circuit.

First, the priority of request is set for each channel. Priority [n] 963, when being set to low priority, outputs a low-level signal, and when being set to high priority, outputs a high-level signal. For a low-priority channel, the waiting time is set. A value to be compared with the count in the waiting time counter 966 is set as the waiting time set value 965.

The waiting time counter 966 is cleared to zero in its initial state, and when sensing the rise of the request signal, starts counting up. The counting up is done for each transfer. Then, the number of data transfers may be counted. By using the clock obtained by frequency-dividing the system clock in an arbitrary period, the elapsed time may be used as a reference. That is, by using the period as a unit, the waiting time set value may be set.

The waiting time counter 966 is cleared to zero by the response signal BDACK[n] to the channel, and thereafter stops counting up until sensing the rise of the next request signal.

When high priority is set in priority [n] 963, the OR circuit 962 inputs a high-level signal to the priority select circuit 961 as a priority select signal, so that the request signal is always outputted as a high-priority request signal. When low priority is set in priority [n]963, a priority select signal is determined by the output of the comparator 964.

It is assumed that the waiting time counter 966 counts up each time transfer is effected and the waiting time set value 965 is set at 4. It is also assumed that a low-priority request cannot be transferred because the mode is in high-priority transfer. On these assumptions, responding to the request signal on the channel, the waiting time counter 966 starts to count up, thereby counting up by one each time high-priority transfer is effected.

When the value in the waiting time counter 966 has reached "5" after the fifth transfer, the output of the comparator 964 goes high, causing the request select circuit to switch to high priority. As a result, the request signal on the channel is outputted as a high-priority request signal.

Since arbitration between high-priority requests is made according to round robin rules, the request on the channel is accepted after several rounds and allowed to transfer data. When transfer has been accepted, BDACK[n] is received as a response signal. As a result, the waiting time counter 966 is initialized, and the priority select signal returns to low priority.

When what is obtained by frequency-dividing the system clock in an arbitrary period is used as the count-up period, priority is changed according to the elapsed time.

Specifically, when the system clock counts the elapsed time on the basis of the period and the counts has reached the waiting time set in the waiting time counter 966, the output of the comparator 964 goes high, causing the request select circuit to switch to high priority. As a result, the request signal on the channel is outputted as a high-priority request signal. Furthermore, going through similar processes as described above, data is transferred, and the priority is also returned to a low level.

Figure 25B:
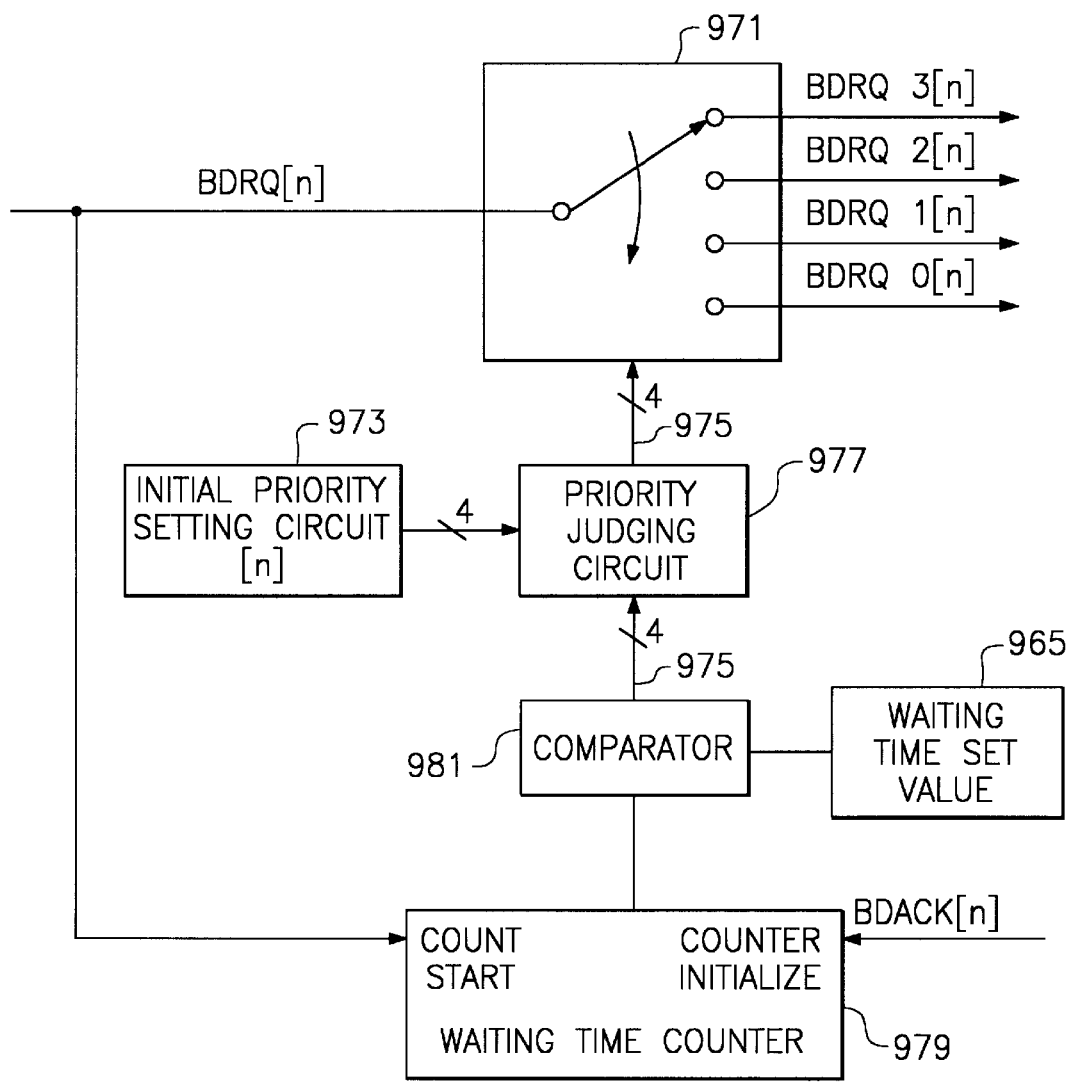

FIG. 25B is a block diagram of another example of the priority select circuit 931, which deals with four or more levels of priority instead of two levels of priority, high priority and low priority. In the figure, the priority select circuit is composed of a waiting time set value 965, a priority select circuit 971, an initial priority setting circuit 973, a plurality of priority signal buses 975, a priority judging circuit 977, a waiting time counter 979, and a comparator 981. As in FIG. 25A, this circuit is for a single request channel. Actually, each channel is provided with the same circuit.

In the circuit, the initial priority setting circuit [n]973, receiving access signal BDRQ[n], outputs the set priority among at least four levels of priority, according to the type of signal. From the time that access signal BDRQ[n] was received, the number of high-priority transfers set in the waiting time set value 965 is compared with the count outputted from the waiting time counter 979, and the comparison result corresponding to the difference is supplied to the priority judging circuit 977 via the priority signal bus 975. For example, if the set value is 5 and the current count is 2, this will give a difference of 3 and thus a signal corresponding to this difference will be supplied.

The priority judging circuit 977 comprehensively judges the signals supplied from the initial priority setting circuit 973 and the comparator 981 and outputs at least four or more levels of priority to the priority select circuit 971. With such a configuration that deals with stepwise priority signals, the more precise setting and changing of priority can be effected in such a manner that priority becomes higher as time elapses, differently from the embodiment of FIG. 25A where whether or not the set value has been reached is judged.

Figure 27:
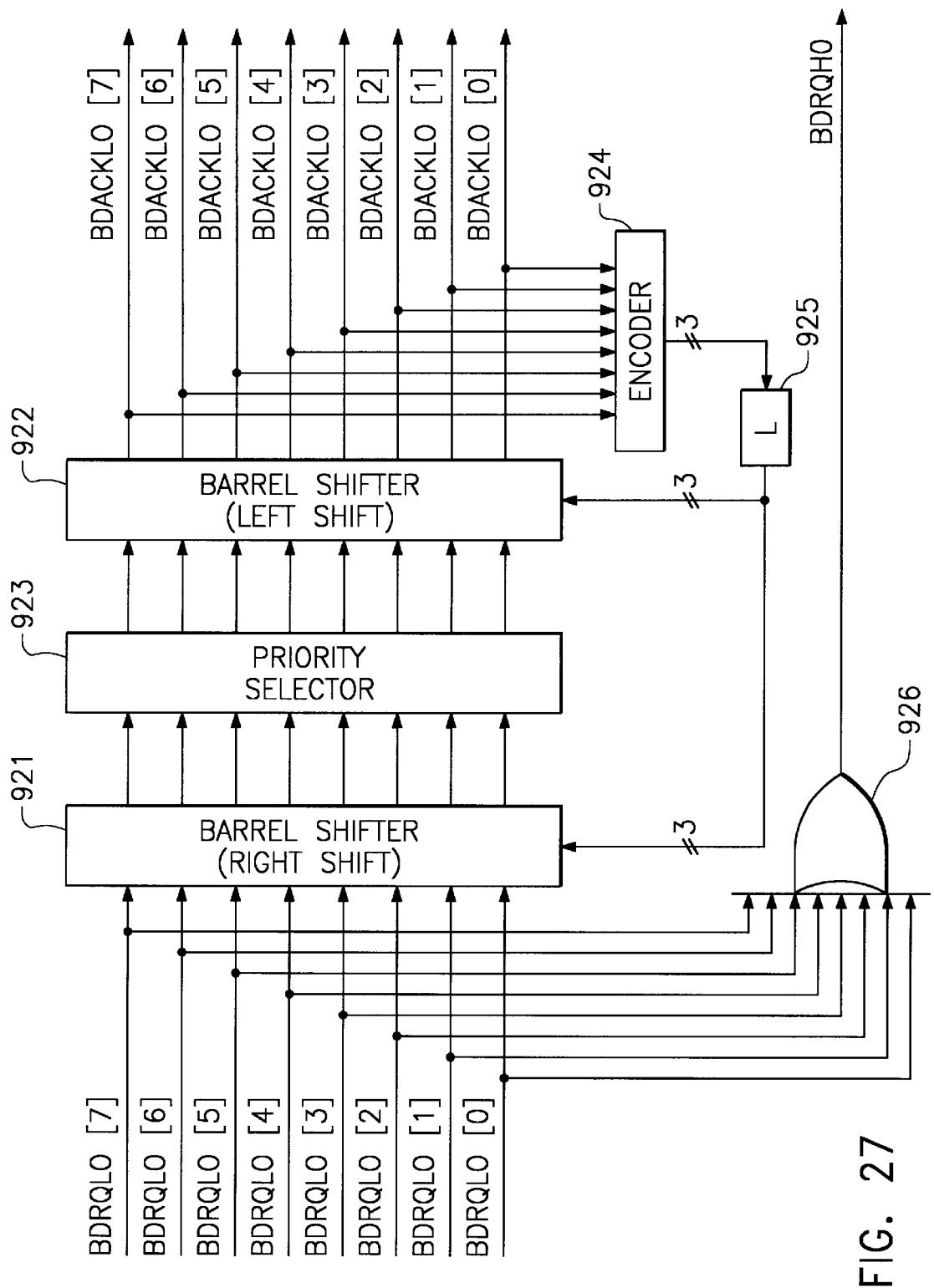
FIG. 27 is a detailed block diagram of the low-priority control circuit of FIG. 23.

FIG. 26 is a circuit diagram of the high-priority control circuit 932. FIG. 27 is a circuit diagram of the low-priority control circuit 933. Since the high-priority control circuit 932 and the low-priority control circuit 933 have the same arrangement, they will be explained simultaneously. The high-priority control circuit 932 (933) is made up of barrel shifters 901, 902 (921, 922), a priority selector 903 (923), an encoder 904 (924), a D latch 905 (925), and an OR circuit 906 (926).

Request signal BDRQHI[0] (BDRQLO[0]) has the highest initial priority and request signal BDRQHI[7] (BDRQLO[7]) has the lowest initial priority. The right-shift-only barrel shifter 901 (921) shifts the request signal right as much as the preceding data transfer allowed.

Figure 28:
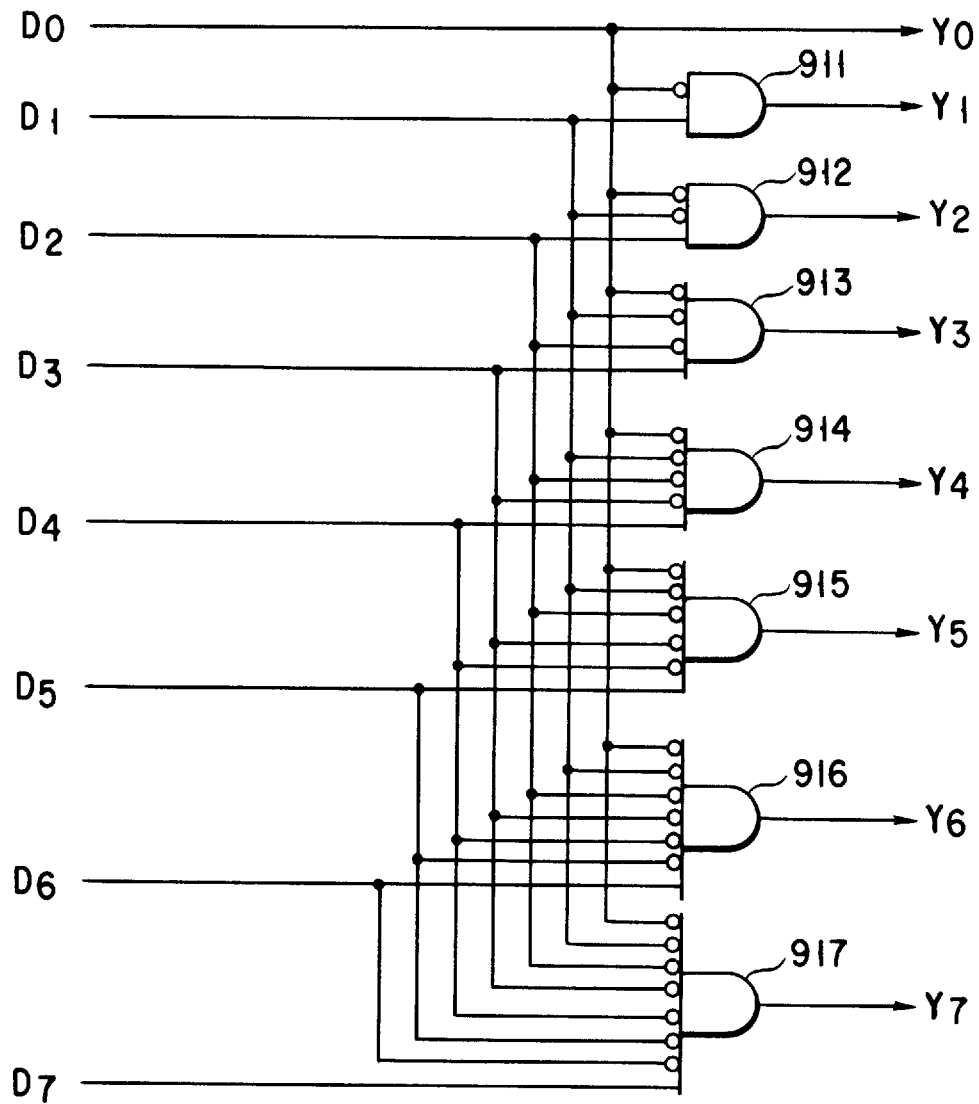
FIG. 28 is a detailed block diagram of the priority selector of FIG. 23.

The priority selector 903 (923) is composed of gate circuits 911 to 917 as shown in FIG. 28, and selects only one channel from a plurality of transfer requests and outputs the selected one.

Of the inputs D7 to D0 to the priority selector 903 (923), D0 has the highest priority and D7 has the lowest priority. The priority selector 903 (923) outputs only the highest priority input (the request closest to D0) directly, and ignores the other requests.

The left-shift-only barrel shifter 902 (922) has the function of returning the request on the channel right shifted at the right-shift-only barrel shifter 901 (921) to the original position. The outputs of the left-shift-only barrel shifter 902 (922) are DMA response signals BDACKHI[7] to BDACKHI[0] (BDACKLO[7] to BDACKLO[0]).

The outputs of the left-shift-only barrel shifter 902 (922) are encoded into 3-bit binary data by the encoder 904 (924). The binary data is latched in the D latch 905 (925) as the amount of shift for the barrel shifters 901, 902 (921, 922) in the next arbitration cycle.

The request signals BDRQHI[7] to BDRQHI[0] (BDRQLO[7] to BDRQLO[0]) are ORed by the OR circuit 906 (926) to create signal BDRQHI (BDRQLO) indicating that the priority control circuit 932 (933) has at least a single request signal.

FIG. 29 is a circuit diagram of the select circuit 934, which is made up of a BDACK signal selector 941 and a D latch 942. Specifically, when the BDACK signal selector 941 and D latch 942 produce a high-priority request signal (BDRQHI signal is active), the high-priority control circuit 932 makes an arbitration decision, and the result is outputted as a transfer channel and a DMA response signal. When there is no high-priority request and there are low-priority request signals, the low-priority control circuit 933 makes an arbitration decision, and the result is outputted as a transfer channel and a DMA response signal.

Explained next will be a data transfer state of the image data transfer bus.

FIG. 30 is a conceptual diagram of the apparatus to help explain a transfer state. It is assumed that the scanner 13 and printer 15 are used as high-priority devices and the FAX 8 and CPU 11 are used as low-priority devices. Each device sends a request signal (REQ) to the memory access arbitration section 27 to request transfer. The memory access arbitration section arbitrates between them, and sends a response signal (ACK) to only one device. The device that has received a response signal transfers data to the common image memory 28 via the data transfer bus 22.

FIG. 31 shows an example of the amount of transferred data necessary in one line transfer period (1 H: the period on the basis of the time required to transfer one line of data to the printer) of the operation when the scanner, printer, FAX, and CPU operate simultaneously (e.g., the image data read from the scanner is transferred to the page memory, and the CPU adds a date and a page to the image, rotates the resulting image through 90 degrees, and outputs the rotated image on the printer, and at the same time, FAX-received data is stored in the page memory). Generally, the amount of transfer to the scanner and printer is large because of multivalued data and high-resolution image data, whereas the amount of transfer to the FAX and CPU is small.

FIG. 32 shows the amount of transferred data at each time in one line period when only one of the scanner, printer, FAX, and CPU operates independently.

The printer has a line buffer in it that is used to rotate an image, and can receives one line of data at a time in the first half of 1 H. The scanner transfers the same amount of data as the printer in 90% of 1 H. The FAX and CPU transfer almost a constant amount of data, regardless of a period of 1 H. That is, when devices do not compete with each other, data can be transferred at the device's maximum transfer speed.

FIG. 33 shows an example of transfer when the image bus priority control section 741 of the embodiment is used. In FIG. 33, even during the period that the high-priority printer and scanner are transferring simultaneously, the low-priority FAX and CPU can transfer data to some extent. Although this lengthens the transfer time in 1 H of the printer and scanner, there is no problem because the transfer time does not exceed the 1 H. Namely, the waiting time set value 965 (see FIGS. 25A, 25B) has only to be adjusted so that a low-priority request may be accepted in a range that has no adverse effect on data transfer to the printer and scanner.

As described above, with the embodiment, instead of allocating high priority and low priority in a fixed manner and arbitrating between requests, by accepting low-priority request at a suitable rate even if high-priority request are present in a range that has no adverse effect on data transfer of the high-priority scanner and printer (i.e., in a range where all the necessary data can be transferred in 1 H while the scanner and printer are operating properly without losing any data), it is possible to average accesses to the common memory, thereby not only increasing the amount of transfer of a low-priority device with a low transfer capability, but also improving the access efficiency of the common memory.

While in the above embodiment, two levels of priority, high and low, are used, three or more levels of priority may be used. That is, by setting the original priority level and a priority level (or levels) after a specified time (or times), priority may be switched to the priority level for which the request signal is set, after the specified time has elapsed.

For instance, it is assumed that the upper limit of the response time to the transfer request of the CPU is determined. In this case, priority is given three levels, high, middle, and low. The printer and scanner are given middle priority, the CPU is given low priority as the original priority. The CPU is given high priority after the specified time has elapsed, and the other devices are not given high priority.

By doing so, even if the access of the CPU is forced to wait because the printer or scanner is accessing, the CPU has the highest priority among all of the devices after the specified time has elapsed, so that after the current transfer has finished, the CPU is allowed to access the switching. As a result, it is possible to fulfill the requirements of the CPU.

As described in detail, with the present invention, it is possible to provide a common-memory access control device capable of improving the access efficiency when a plurality of devices with different access frequency access a common memory, and an image forming apparatus using this memory access control device.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An access control apparatus comprising:

storing means for storing data;

classifying means for receiving a plurality of access requests each associated with a respective device, and for classifying said plurality of access requests into at least two priority levels;

priority-level upping means for upping the priority level of a selected device which has a lower priority level than at least one of said plurality of access requests, when access responsive to an access request is not executed for at least a predetermined time period; and controlling means for providing controlled access to said storing means on the basis of an order determined between at least two of said plurality of access requests each of which is determined to have a high priority level;

wherein said priority-level upping means includes means for upping the priority level of said selected device by at least two priority levels in accordance with a time period for which access responsive to said plurality of access requests is not executed.

2. An access control apparatus comprising:

storing means for storing data;

classifying means for receiving a plurality of access requests each associated with a respective device, and for classifying said plurality of access requests into at least two priority levels;

priority-level upping means for upping the priority level of a selected device which has a lower priority level than at least one of said plurality of access requests, when access responsive to an access request is not executed for at least a predetermined time period; and controlling means for providing controlled access to said storing means on the basis of an order determined between at least two of said plurality of access requests each of which is determined to have a high priority level wherein said priority level-upping means includes means for upping the priority level of said selected device when a time period for which said storing means is accessed in response to said plurality of access requests is within one scanning line cycle of another device having an access request determined to be high priority level.

3. An access control apparatus comprising:

storing means for storing data;

determining means for receiving a plurality of access requests and for determining a priority level for each access request, including a first priority level and a second priority level, wherein the second priority level is lower than the first priority level;

first controlling means for providing controlled access to said storing means on the basis of an order determined between a first access request having the first priority level and a second access request having a priority level which has been changed by a priority-level changing means from the second priority level to the first priority level;

second controlling means for providing controlled access to said storing means on the basis of an order determined between at least two access requests each having the second priority level when there are no access requests having the first priority level; and priority-level changing means for changing the priority level of any access request from the second priority level to the first priority level, and then sending said any access request to the first controlling means, when said plurality of access requests include at least one access request determined to be a first priority level access request, and wherein controlled access to said storing means is queued for at least a predetermined time period;

wherein said first controlling means includes means for restoring said second access request from the first priority level to the second priority level after the storing means is accessed in response to said any access request, and then for sending said second access request to said second controlling means; and means for placing said second access request as a last of said at least two access requests, and then providing controlled access to said storing means on the basis of an order determined between said at least two access requests and said second access request, when said plurality of access requests include no access requests having a first priority level.

4. An access control apparatus comprising:

storing means for storing data;

determining means for receiving a plurality of access requests and for determining a priority level for each access request, including a first priority level and a second priority level, wherein the second priority level is lower than the first priority level;

first controlling means for providing controlled access to said storing means on the basis of an order determined between a first access request having the first priority level and a second access request having a priority level which has been changed by a priority-level changing means from the second priority level to the first priority level;

second controlling means for providing controlled access to said storing means on the basis of an order determined between at least two access requests each having the second priority level when there are no access requests having the first priority level; and priority-level changing means for changing the priority level of any access request from the second priority level to the first priority level, and then sending said any access request to the first controlling means, when said plurality of access requests include at least one access request determined to be a first priority level access request, and wherein controlled access to said storing means is queued for at least a predetermined time period;

wherein said priority-level changing means includes means for changing the priority level of said second access request from the second priority level to the first priority level, and then sending said second access request to said first controlling means, when a time period for which said storing means is accessed in response to said any access request is within one scanning line cycle of a device which issues an access request having the first priority level.

* * * * *